(12) United States Patent
Amano et al.

(10) Patent No.: US 9,682,695 B2
(45) Date of Patent: Jun. 20, 2017

(54) VEHICLE CONTROL APPARATUS AND VEHICLE CONTROL METHOD

(71) Applicant: TOYOTA JIDOSHA KABUSHIKI KAISHA, Toyota-shi, Aichi-ken (JP)

(72) Inventors: Takashi Amano, Susono (JP); Hidehumi Aikawa, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/927,997

(22) Filed: Oct. 30, 2015

(65) Prior Publication Data

US 2016/0121878 A1 May 5, 2016

(30) Foreign Application Priority Data

Oct. 31, 2014 (JP) .................................. 2014-222356
May 27, 2015 (JP) .................................. 2015-107713

(51) Int. Cl.
*B60W 20/15* (2016.01)
*B60W 20/13* (2016.01)
(Continued)

(52) U.S. Cl.
CPC ............. *B60W 20/15* (2016.01); *B60K 6/445* (2013.01); *B60W 10/06* (2013.01); *B60W 10/08* (2013.01); *B60W 10/26* (2013.01); *B60W 20/00* (2013.01); *B60W 20/13* (2016.01); *B60W 30/188* (2013.01); *B60W 30/18072* (2013.01); *B60W 2030/1809* (2013.01);
(Continued)

(58) Field of Classification Search
CPC ...................................................... B60W 20/15
See application file for complete search history.

(56) References Cited

U.S. PATENT DOCUMENTS 7,703,563 B2 * 4/2010 Aldrich, III ........... B60K 6/485
180/65.21
9,096,221 B2 * 8/2015 Kim ...................... B60W 20/14
(Continued)

FOREIGN PATENT DOCUMENTS

EP 2529972 A1 12/2012
EP 2927073 A1 10/2015
(Continued)

*Primary Examiner* — Thomas Tarcza
*Assistant Examiner* — Michael Berns
(74) *Attorney, Agent, or Firm* — Sughrue Mion, PLLC

(57) ABSTRACT

A vehicle control apparatus controls a vehicle including an internal combustion engine, a power generation unit that converts at least one of an engine output of the internal combustion engine and a kinetic energy of the vehicle into electric power, and a power storage unit that stores the electric power. The vehicle control apparatus includes: a first control unit configured to control the vehicle to alternate repeatedly between acceleration travel, in which the vehicle accelerates using the engine output, and coasting travel, in which the vehicle coasts without using the engine output, such that a vehicle speed is maintained within a predetermined speed region; and a second control unit configured to control the power generation unit to convert at least one of the engine output and the kinetic energy into electric power during a coasting period in which the vehicle performs the coasting travel.

4 Claims, 11 Drawing Sheets

(51) Int. Cl.
  *B60W 30/188* (2012.01)
  *B60W 10/06* (2006.01)
  *B60W 10/08* (2006.01)
  *B60W 10/26* (2006.01)
  *B60K 6/445* (2007.10)
  *B60W 20/00* (2016.01)
  *B60W 30/18* (2012.01)

(52) U.S. Cl.
  CPC . *B60W 2510/244* (2013.01); *B60W 2720/106* (2013.01); *Y02T 10/6286* (2013.01); *Y10S 903/905* (2013.01); *Y10S 903/906* (2013.01); *Y10S 903/907* (2013.01); *Y10S 903/93* (2013.01)

(56) References Cited

U.S. PATENT DOCUMENTS

2006/0231304 A1* 10/2006 Severinsky ............ B60H 1/004
                                                                  180/65.23
2010/0004843 A1    1/2010  Yu et al.
2013/0179014 A1*  7/2013  Yamazaki ............ B60W 10/06
                                                                  701/22
2014/0148983 A1    5/2014  Kim
2014/0277989 A1*  9/2014  Krueger ............... B60W 10/184
                                                                  701/96
2015/0321564 A1* 11/2015  Huh ..................... B60W 10/196
                                                                  701/22

FOREIGN PATENT DOCUMENTS

| | | |
|---|---|---|
| JP | 2010-167994 A | 8/2010 |
| JP | 2010-280363 A | 12/2010 |
| JP | 2013-126806 A | 6/2013 |
| JP | 2013-127224 A | 6/2013 |
| JP | 2013-184651 A | 9/2013 |
| JP | 2014-104864 A | 6/2014 |

* cited by examiner

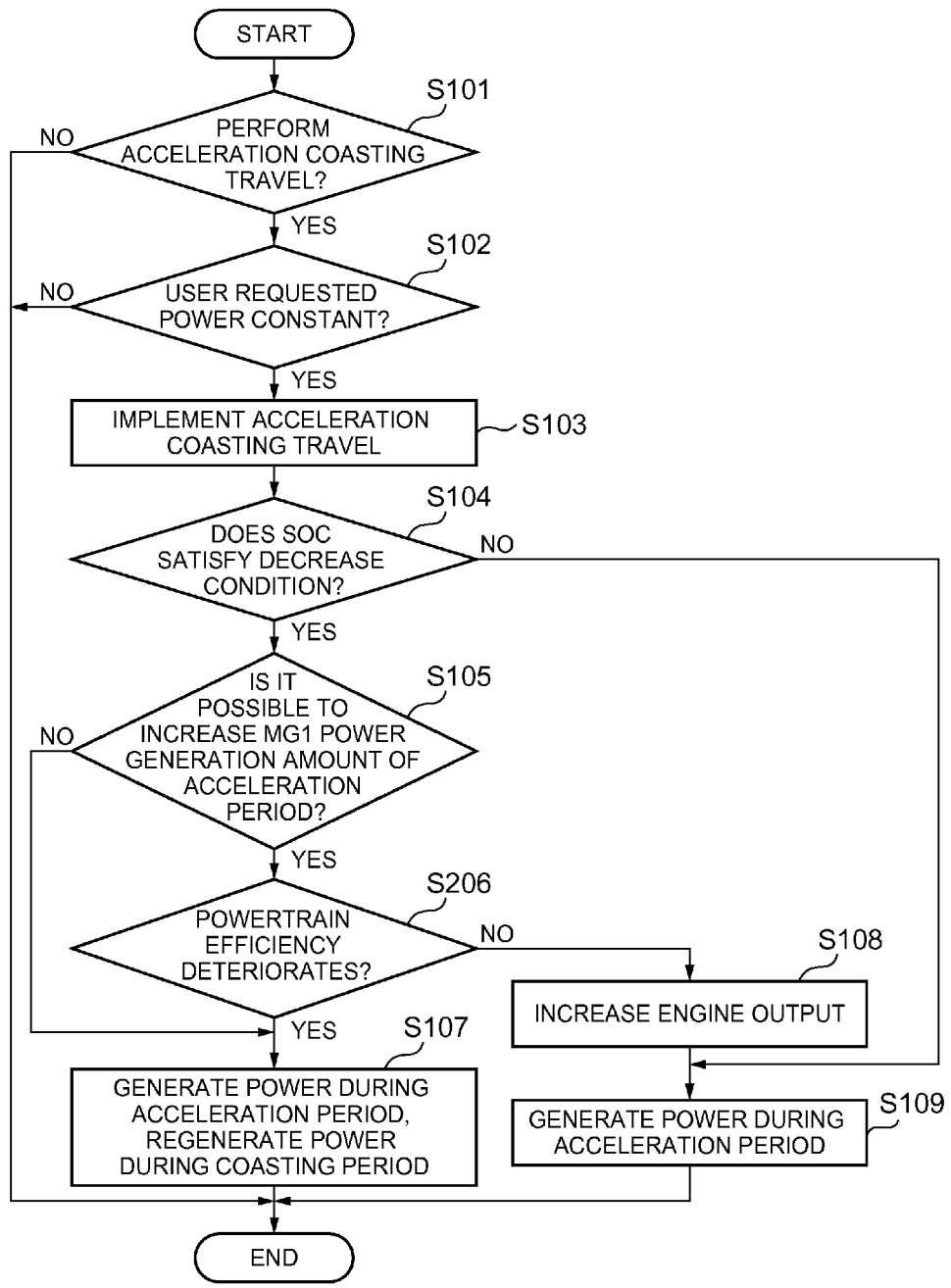

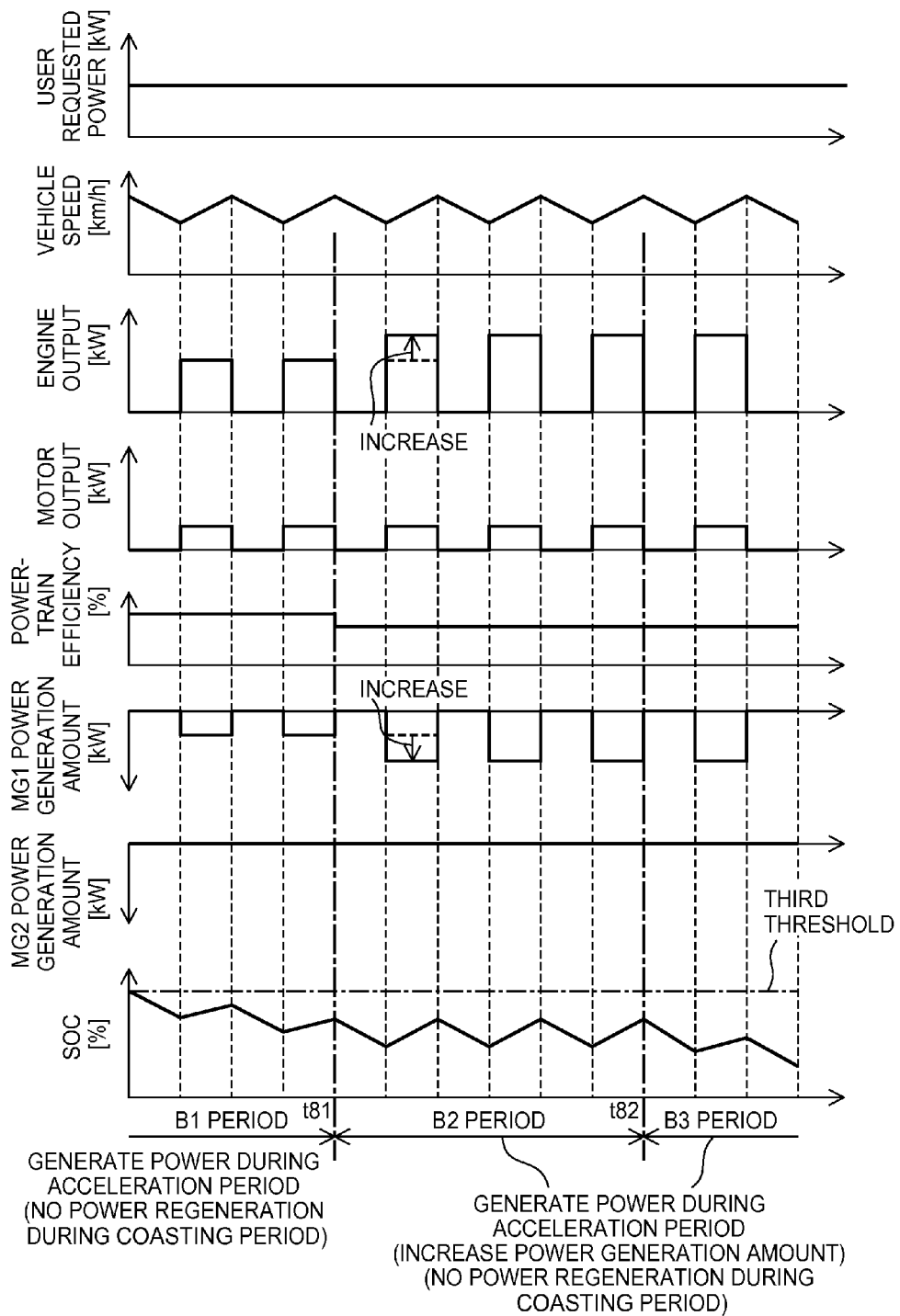

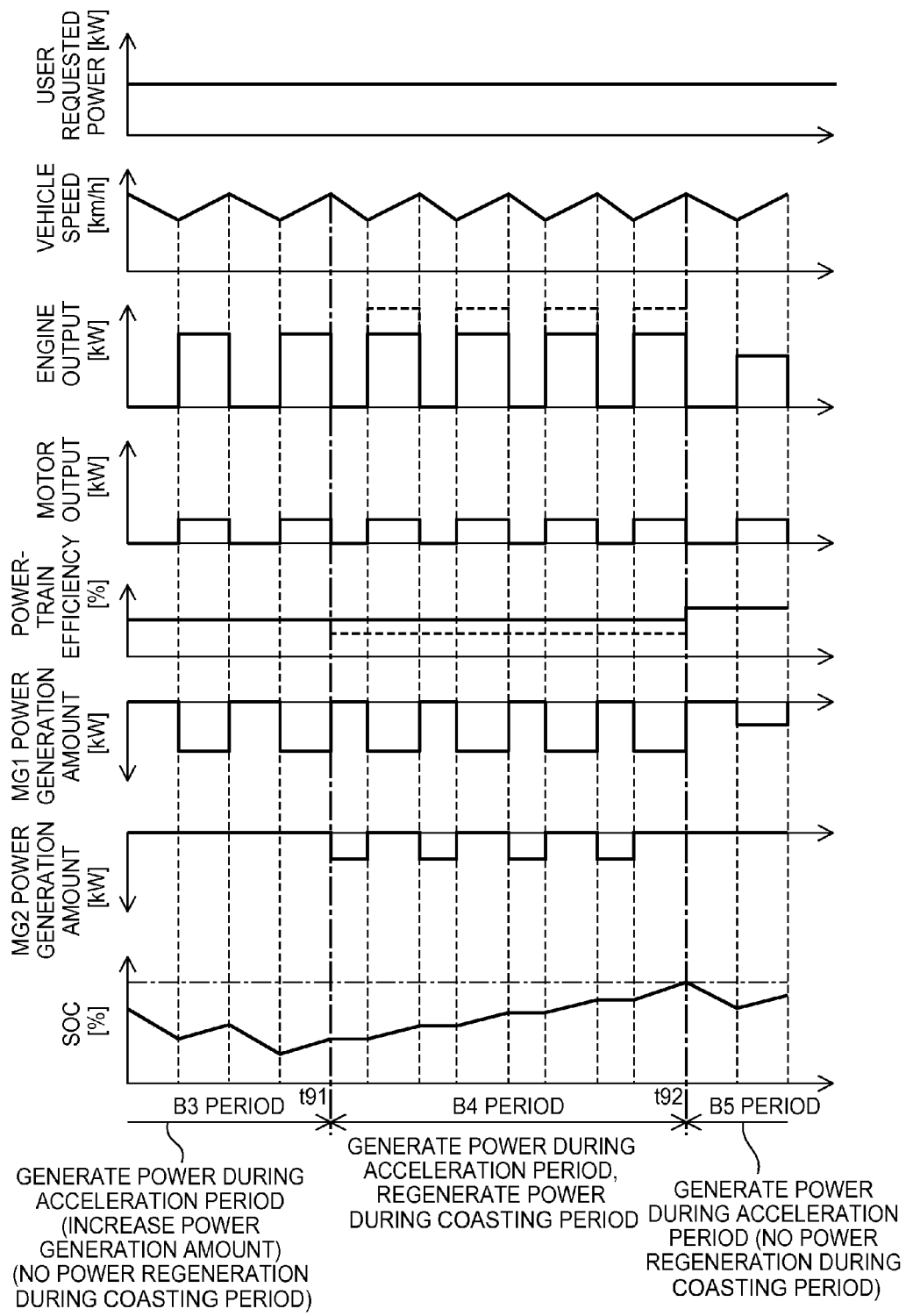

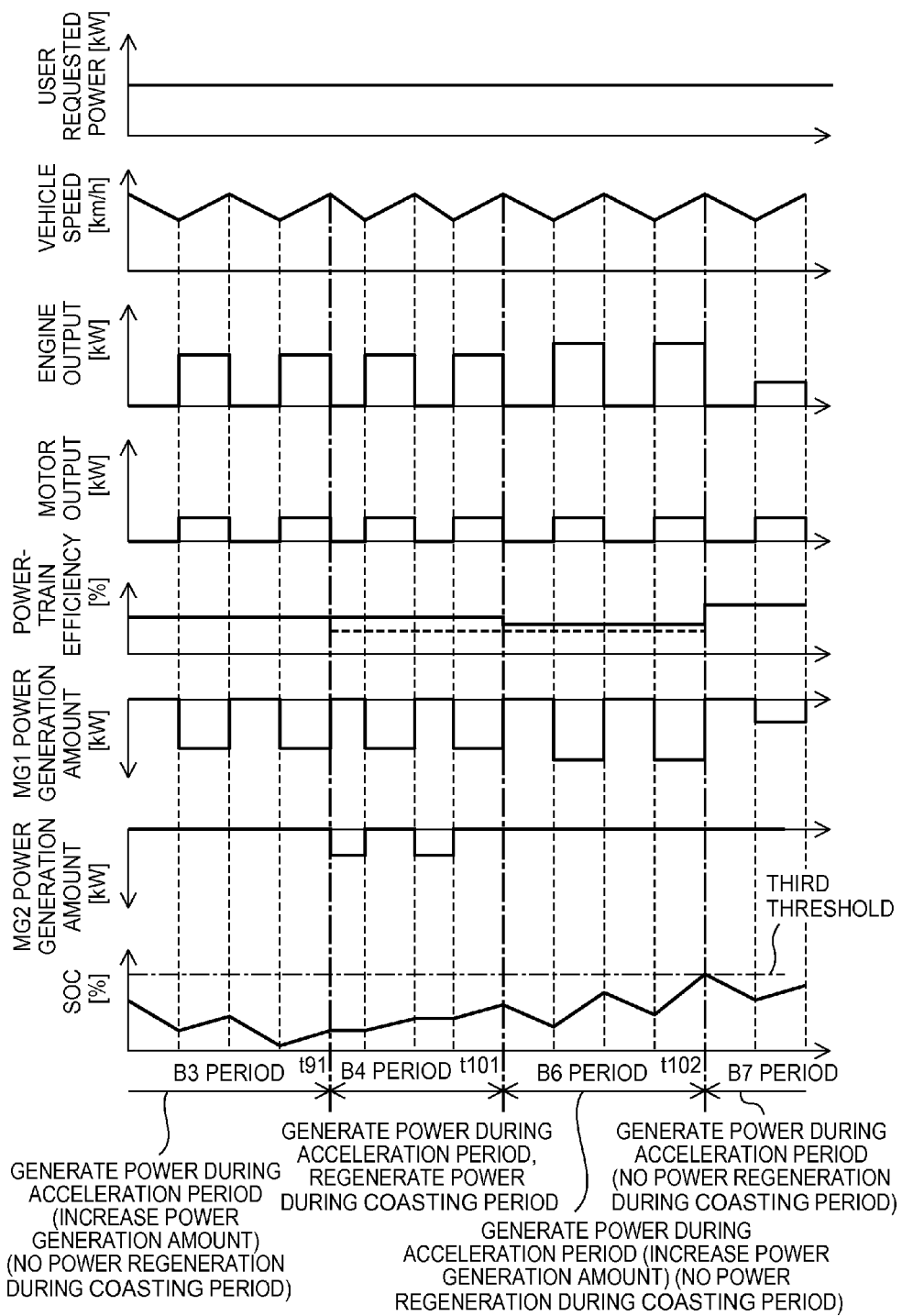

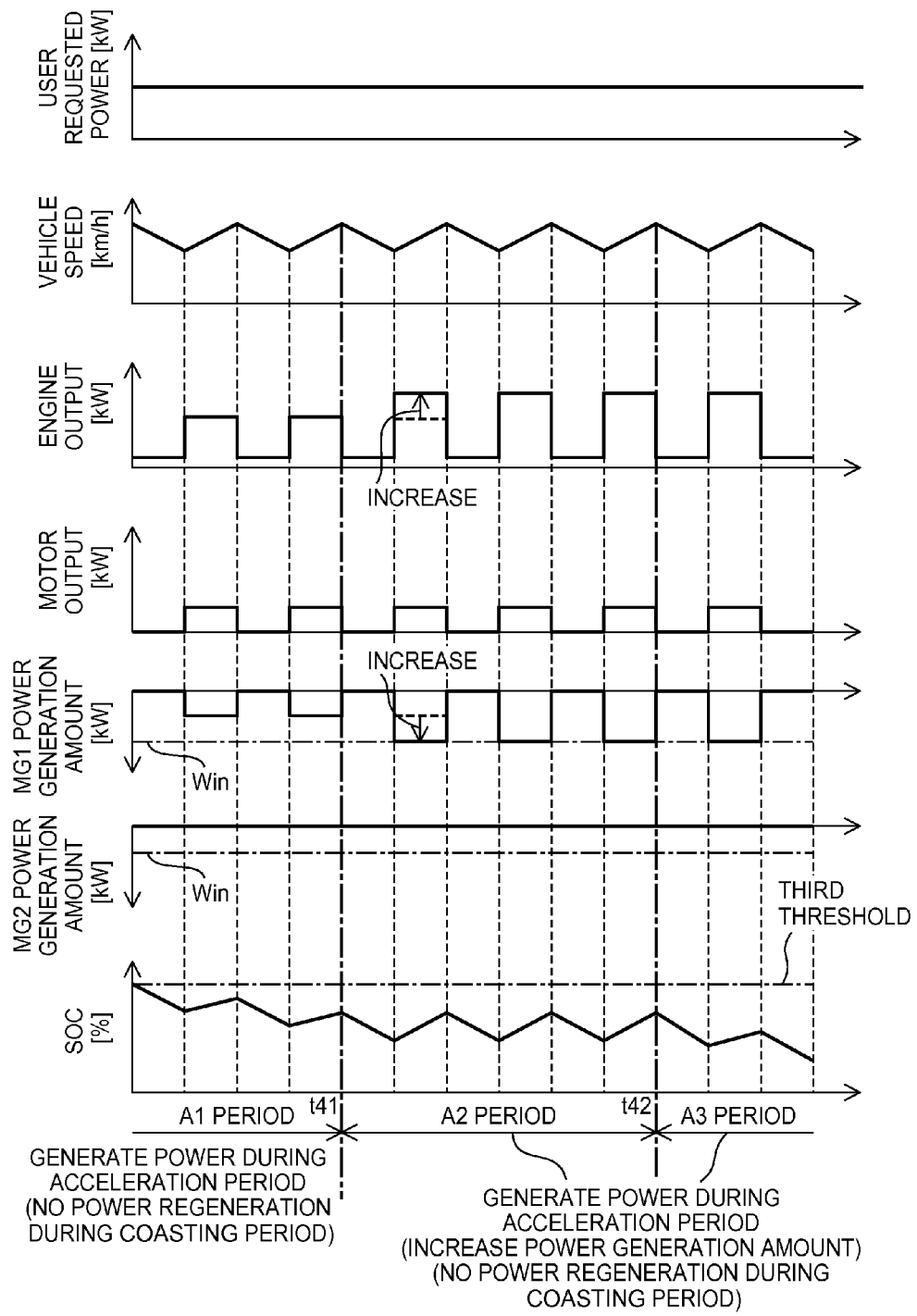

VEHICLE CONTROL APPARATUS AND VEHICLE CONTROL METHOD

INCORPORATION BY REFERENCE

The disclosure of Japanese Patent Application No. 2014-222356 filed on Oct. 31, 2014 and 2015-107713 filed on May 27, 2015, each including the specification, drawings and abstract, is incorporated herein by reference in its entirety.

BACKGROUND OF THE INVENTION

1. Field of the Invention

The invention relates to a vehicle control apparatus and a vehicle control method for controlling a vehicle.

2. Description of Related Art

Japanese Patent Application Publication No. 2010-280363 (JP 2010-280363 A) describes a vehicle control apparatus that controls a vehicle having an internal combustion engine that can be switched between an operative condition and an inoperative condition to perform acceleration coasting travel. Here, the acceleration coasting travel as described in JP 2010-280363 A is travel performed in a set vehicle speed region by alternating repeatedly between acceleration travel and coasting travel. During the acceleration travel, the internal combustion engine is set in the operative condition such that the vehicle is driven to accelerate using driving force obtained from an engine output and transmitted to a drive wheel. During the coasting travel, the internal combustion engine is set in the inoperative condition such that the vehicle coasts using inertial force.

Japanese Patent Application Publication No. 2013-126806 (JP 2013-126806 A) may also be cited as a related art document.

In JP 2010-280363 A, the acceleration coasting travel is performed on a hybrid vehicle having an internal combustion engine and a motor that is capable of converting the engine output of the internal combustion engine into charging power that is charged to a secondary battery (i.e. capable of generating power).

Here, when the vehicle performs the acceleration coasting travel, the motor converts the engine output into charging power during the acceleration travel. Depending on travel conditions of the hybrid vehicle and so on, however, an amount of power stored in the secondary battery (a power storage amount) may decrease gradually when the motor simply converts the engine output into charging power during the acceleration travel. The power storage amount may decrease gradually when, for example, an amount of power (a charge amount, or in other words an amount of power generated by the motor and not consumed by accessories and the like) newly stored in the secondary battery during the acceleration travel is smaller than an amount of power (a discharge amount, or in other words an amount of power consumed by the accessories and the like) newly discharged by the secondary battery during the coasting travel. When the power storage amount continues to decrease in this manner, the power storage amount may decrease excessively. As a result, a fuel efficiency of the vehicle may deteriorate in accordance with the excessive reduction in the power storage amount.

When the acceleration coasting travel is terminated in the vehicle in a condition where the power storage amount has decreased excessively, for example, the reduced power storage amount means that the hybrid vehicle cannot travel using the output of the motor while the internal combustion engine is set in the inoperative condition. In other words, the hybrid vehicle cannot travel as a so-called electric vehicle (EV). As a result, the fuel efficiency may deteriorate correspondingly.

When the acceleration coasting travel is terminated in the vehicle in a condition where the power storage amount has decreased excessively, for example, it may be necessary to set the internal combustion engine in the operative condition simply to increase the power storage amount. As a result, the fuel efficiency may deteriorate correspondingly.

When the acceleration coasting travel is underway in the hybrid vehicle, the hybrid vehicle is switched from the coasting travel to the acceleration travel by cranking the internal combustion engine using the motor, for example, in order to switch the internal combustion engine from the inoperative condition to the operative condition. In a condition where the power storage amount has decreased excessively, however, it may be difficult to crank the internal combustion engine using the motor. Accordingly, it may be difficult for the hybrid vehicle to continue the acceleration coasting travel. As a result, the fuel efficiency may deteriorate correspondingly.

Note that deterioration of the fuel efficiency corresponding to an excessive reduction in the power storage amount is not limited to a hybrid vehicle having an internal combustion engine and a motor that can generate power, and may occur similarly in any vehicle having an internal combustion engine and a motor. Moreover, deterioration of the fuel efficiency corresponding to an excessive reduction in the power storage amount is not limited to a vehicle that is caused to alternate repeatedly between acceleration travel and coasting travel by switching the internal combustion engine between an operative condition and an inoperative condition, and may occur similarly in any vehicle that alternates repeatedly between acceleration travel, in which the vehicle accelerates using the engine output, and coasting travel, in which the vehicle coasts without using the engine output, regardless of whether or not the internal combustion engine is switched between the operative condition and the inoperative condition.

SUMMARY OF THE INVENTION

The invention provides a vehicle control apparatus and a vehicle control method with which fuel efficiency deterioration caused by a reduction in a power storage amount occurring when a vehicle speed of a vehicle is maintained within a predetermined speed region by alternating repeatedly between acceleration travel and coasting travel can be suppressed favorably.

A first aspect of the invention relates to a vehicle control apparatus that controls a vehicle including an internal combustion engine, a power generation unit that converts at least one of an engine output of the internal combustion engine and a kinetic energy of the vehicle into electric power, and a power storage unit that stores the electric power converted by the power generation unit. The vehicle control apparatus includes: a first control unit configured to control the vehicle to alternate repeatedly between acceleration travel, in which the vehicle accelerates using the engine output, and coasting travel, in which the vehicle coasts without using the engine output, such that a vehicle speed of the vehicle is maintained within a predetermined speed region; and a second control unit configured to control the power generation unit to convert at least one of the engine output and the kinetic energy into electric power during a coasting period in which the vehicle performs the coasting travel.

According to the first aspect, the power generation unit can be caused to generate power during the coasting period mainly under the control of the second control unit. In other words, the power storage unit is charged during the coasting period. Hence, a reduction in the power storage amount of the power storage unit (in other words, the amount of power stored in the power storage unit) as the vehicle alternates repeatedly between the acceleration travel and the coasting travel can be suppressed (or prevented) favorably. Accordingly, an excessive reduction in the power storage amount of the power storage unit is likewise suppressed favorably. As a result, deterioration of the fuel efficiency of the vehicle due to an excessive reduction in the power storage amount of the power storage unit is suppressed favorably.

The second control unit may be configured to control the power generation unit to convert at least one of the engine output and the kinetic energy into electric power during the coasting period when a power storage amount of the power storage unit decreases while the vehicle alternates repeatedly between the acceleration travel and the coasting travel.

According to this configuration, a reduction in the power storage amount of the power storage unit as the vehicle alternates repeatedly between the acceleration travel and the coasting travel is suppressed favorably. Accordingly, an excessive reduction in the power storage amount of the power storage unit is likewise suppressed favorably. As a result, deterioration of the fuel efficiency of the vehicle due to an excessive reduction in the power storage amount of the power storage unit is suppressed favorably.

The second control unit may be configured to control the power generation unit to convert at least one of the engine output and the kinetic energy into electric power during the coasting period when (i) the power storage amount decreases and (ii) it is not possible to increase an amount of power obtained by the power generation unit by converting the engine output into electric power during an acceleration period in which the vehicle performs the acceleration travel so as to stop the power storage amount decreasing.

According to this aspect, the second control unit controls the power generation unit to convert at least one of the engine output and the kinetic energy into electric power during the coasting period when it is not possible to increase the amount of power generated during the acceleration period so as to suppress a reduction in the power storage amount as the vehicle alternates repeatedly between the acceleration travel and the coasting travel. In other words, when it is possible to increase the amount of power generated during the acceleration period so as to suppress the reduction in the power storage amount as the vehicle alternates repeatedly between the acceleration travel and the coasting travel, the second control unit need not control the power generation unit to convert at least one of the engine output and the kinetic energy into electric power during the coasting period. As a result, an excessive reduction in the length of the coasting period is suppressed while also favorably suppressing deterioration of the fuel efficiency of the vehicle due to an excessive reduction in the power storage amount of the power storage unit.

The second control unit may be configured to control the power generation unit to convert at least one of the engine output and the kinetic energy into electric power during the coasting period when (i) the power storage amount decreases and (ii) an efficiency of a powertrain of the vehicle, the powertrain including the internal combustion engine, deteriorates by at least a predetermined amount after an amount of power obtained by the power generation unit by converting the engine output into electric power during an acceleration period in which the vehicle performs the acceleration travel is increased so as to stop the power storage amount decreasing.

As described above, when the power storage amount decreases as the vehicle alternates repeatedly between the acceleration travel and the coasting travel even in a case where the power generation unit converts the engine output into electric power during the acceleration period, the power generation unit may suppress the reduction in the power storage amount by increasing the amount of power generated during the acceleration period. The power generation amount is typically increased by increasing the engine output. However, an increase in the engine output leads to variation in an operating point of the internal combustion engine, and when the operating point of the internal combustion engine is modified, the efficiency of the powertrain of the vehicle, the powertrain including the internal combustion engine, varies (deteriorates, for example). When the efficiency of the powertrain varies (deteriorates, for example), the fuel efficiency of the vehicle varies (deteriorates, for example). Therefore, when the amount of power generated during the acceleration period is increased in order to suppress deterioration of the fuel efficiency due to an excessive reduction in the power storage amount, the efficiency of the powertrain may deteriorate, causing the fuel efficiency to deteriorate even further.

According to the configuration described above, the second control unit controls the power generation unit to convert at least one of the engine output and the kinetic energy into electric power during the coasting period when the efficiency of the powertrain deteriorates by at least the predetermined amount after the amount of power generated during the acceleration period is increased so as to suppress a reduction in the power storage amount as the vehicle alternates repeatedly between the acceleration travel and the coasting travel. As a result, an excessive reduction in the length of the coasting period is suppressed while also favorably suppressing deterioration of the fuel efficiency of the vehicle due to an excessive reduction in the power storage amount of the power storage unit and deterioration of the fuel efficiency of the vehicle due to deterioration of the efficiency of the powertrain.

During the acceleration travel, the internal combustion engine may be set in an operative condition, and during the coasting travel, the internal combustion engine may be set in an inoperative condition. In this case, the second control unit may be configured to control the power generation unit to convert the kinetic energy into electric power during at least a part of the coasting period.

According to this configuration, a reduction in the power storage amount of the power storage unit is suppressed favorably as the vehicle alternates repeatedly between the acceleration travel, in which the internal combustion engine is in the operative condition, and the coasting travel, in which the internal combustion engine is in the inoperative condition. Accordingly, an excessive reduction in the power storage amount of the power storage unit is likewise suppressed favorably. As a result, deterioration of the fuel efficiency of the vehicle due to an excessive reduction in the power storage amount of the power storage unit is suppressed favorably.

A second aspect of the invention relates to a vehicle control method for controlling a vehicle including an internal combustion engine, power generation unit that converts at least one of an engine output of the internal combustion engine and a kinetic energy of the vehicle into electric power, and power storage unit that stores the electric power converted by the power generation unit. The vehicle control method includes: controlling the vehicle to alternate repeatedly between acceleration travel, in which the vehicle accelerates using the engine output, and coasting travel, in which the vehicle coasts without using the engine output, such that a vehicle speed of the vehicle is maintained within a predetermined speed region; and controlling the power generation unit to convert at least one of the engine output and the kinetic energy into electric power during a coasting period in which the vehicle performs the coasting travel.

According to the second aspect, similarly to the first aspect, deterioration of the fuel efficiency of the vehicle caused by an excessive reduction in the power storage amount of the power storage unit is suppressed favorably.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a flowchart showing a flow of a second example operation of the hybrid vehicle according to this embodiment (more particularly, a second example operation of the hybrid vehicle during the acceleration coasting travel);

FIG. 8 is a timing chart showing the user requested power, the vehicle speed, the engine output, a powertrain efficiency, the motor output, the MG1 power generation amount, the MG2 power generation amount, and the SOC of the battery in a case where an excessive reduction in the SOC is suppressed by increasing the MG1 power generation amount in accordance with the second example operation;

FIG. 9 is a first example of a timing chart showing the user requested power, the vehicle speed, the engine output, the motor output, the MG1 power generation amount, the MG2 power generation amount, and the SOC of the battery in a case where an excessive reduction in the SOC is suppressed by regenerating power using the motor/generator MG2 during the coasting period in accordance with the second example operation;

FIG. 10 is a second example of a timing chart showing the user requested power, the vehicle speed, the engine output, the motor output, the MG1 power generation amount, the MG2 power generation amount, and the SOC of the battery in a case where an excessive reduction in the SOC is suppressed by regenerating power using the motor/generator MG2 during the coasting period in accordance with the second example operation; and FIG. 11 is a timing chart showing the user requested power, the vehicle speed, the engine output, the powertrain efficiency, the motor output, the MG1 power generation amount, the MG2 power generation amount, and the SOC of the battery in a case where an excessive reduction in the SOC is suppressed by increasing the MG1 power generation amount in accordance with the first example operation in a situation where an engine ENG remains in an operative condition during the coasting period.

DETAILED DESCRIPTION OF EMBODIMENTS

An embodiment of a vehicle control apparatus according to the invention will be described below with reference to the drawings. Note that in the following description, the vehicle control apparatus according to this embodiment of the invention is applied to a hybrid vehicle 10.

First, referring to FIG. 1, a configuration of the hybrid vehicle 10 according to this embodiment will be described. Here, FIG. 1 is a block diagram showing an example of the configuration of the hybrid vehicle 10 according to this embodiment.

Figure 1:
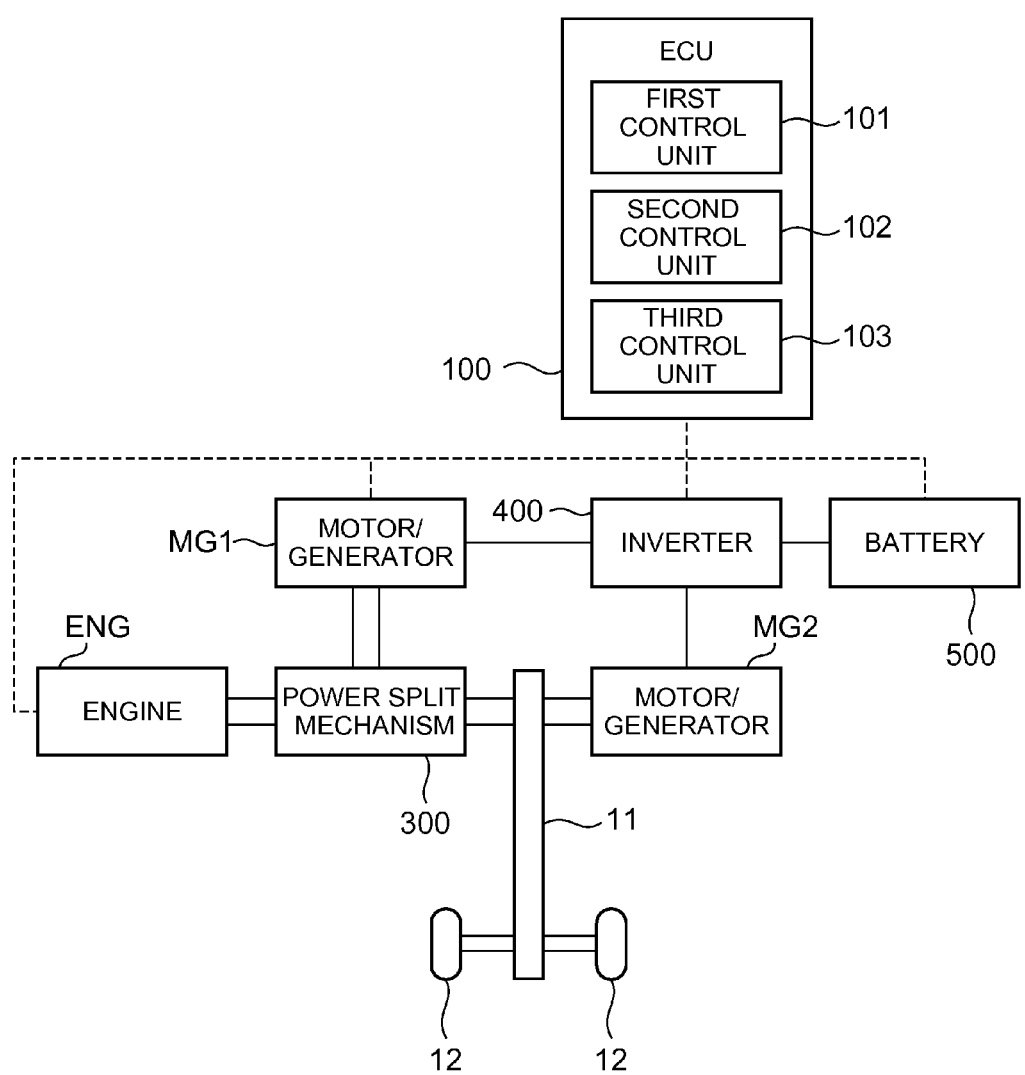
FIG. 1 is a block diagram showing an example of a configuration of a hybrid vehicle according to an embodiment.

As shown in FIG. 1, the hybrid vehicle 10 includes an axle 11, vehicle wheels 12, an electronic control unit (ECU) 100 serving as a specific example of a "vehicle control apparatus", an engine ENG serving as a specific example of an "internal combustion engine", a motor/generator MG1 serving as a specific example of a "power generation unit (power generating means)", a motor/generator MG2 serving as a specific example of the "power generation unit (power generating means)", a power split mechanism 300, an inverter 400, and a battery 500 serving as a specific example of a "power storage unit (power storing means)".

The axle 11 is a transmission shaft for transmitting power output from the engine ENG and the motor/generator MG2 to the vehicle wheels. The vehicle wheels 12 are means for transmitting the power transmitted thereto via the axle 11 to a road surface.

The ECU 100 is configured to control an overall operation of the hybrid vehicle 10. In this embodiment in particular, the ECU 100 includes, as either physically realized circuit elements or logically realized processing blocks in the interior of the ECU 100, a first control unit 101 serving as a specific example of a "first control unit (first control means)", a second control unit 102 serving as a specific example of a "second control unit (second control means)", and a third control unit 103 serving as a specific example of a "third control unit (third control means)".

The first control unit 101 mainly controls the overall operation of the hybrid vehicle 10. In particular, the first control unit 101 controls the hybrid vehicle 10 such that the hybrid vehicle 10 performs acceleration coasting travel (in other words, intermittent travel). The second control unit 102 mainly controls power generation (in other words, power regeneration) by the motor/generator MG2 during a coasting period, in which the hybrid vehicle 10 performs coasting travel, as required in cooperation with the first control unit 101. The third control unit 103 mainly controls power generation by the motor/generator MG1 during an acceleration period, in which the hybrid vehicle 10 performs acceleration travel, as required in cooperation with the first control unit 101. Note that the acceleration coasting travel will be described in detail below with reference to FIG. 2 and so on, and is not therefore described in detail here.

The engine ENG is driven (i.e. operated) by burning fuel such as gasoline or light oil. The engine ENG functions as a main power source of the hybrid vehicle 10. In addition, the engine ENG functions as a power source for rotating (i.e. driving) a rotary shaft of the motor/generator MG1, to be described below.

The motor/generator MG1 functions as a power generator used to charge the battery 500. When the motor/generator MG1 functions as a power generator, the rotary shaft of the motor/generator MG1 is rotated by power from the engine ENG. Note, however, that by driving the motor/generator MG1 using power stored in the battery 500, the motor/generator MG1 can function as a motor that supplies power to the hybrid vehicle 10.

The motor/generator MG2 is driven using the power stored in the battery 500 so as to function as a motor that supplies power to the hybrid vehicle 10. In addition, the motor/generator MG2 functions as a power generator used to charge the battery 500. When the motor/generator MG2 functions as a power generator, a rotary shaft of the motor/generator MG2 is rotated by power transmitted to the motor/generator MG2 from the axle 11.

The power split mechanism 300 is a planetary gear mechanism having a sun gear, a planetary carrier, a pinion gear, and a ring gear, none of which are shown in the drawing. A rotary shaft of the sun gear is coupled to the rotary shaft of the motor/generator MG1, for example. A rotary shaft of the ring gear is coupled to the rotary shaft of the motor/generator MG2, for example. A rotary shaft of the planetary carrier positioned between the sun gear and the ring gear is coupled to a rotary shaft (in other words a crankshaft) of the engine ENG, for example. Rotation of the engine ENG is transmitted to the sun gear and the ring gear by the planetary carrier and the pinion gear. In other words, the power of the engine ENG is distributed between two systems. In the hybrid vehicle 10, the rotary shaft of the ring gear is coupled to the axle 11 of the hybrid vehicle 10 such that driving force is transmitted to the vehicle wheels 12 via the axle 11.

The inverter 400 converts direct current power extracted from the battery 500 into alternating current power, and supplies the alternating current power to the motor/generator MG1 and the motor/generator MG2. Further, the inverter 400 converts alternating current power generated by the motor/generator MG1 and the motor/generator MG2 into direct current power, and supplies the direct current power to the battery 500. Note that the inverter 400 may be configured as a part of a so-called power control unit (PCU).

The battery 500 is a power supply source that supplies power for driving the motor/generator MG1 and the motor/generator MG2 to the motor/generator MG1 and the motor/generator MG2. The battery 500 is a chargeable storage battery.

Note that the battery 500 may be charged by receiving a supply of power from a power supply on the exterior of the hybrid vehicle 10. In other words, the hybrid vehicle 10 may be a so-called plug-in hybrid vehicle.

Next, referring to FIGS. 2 to 5, an operation of the hybrid vehicle 10 (in particular, an operation of the hybrid vehicle 10 during the acceleration coasting travel) will be described. Note that two example operations (first and second example operations) are described below as example operations of the hybrid vehicle 10.

Figure 2:
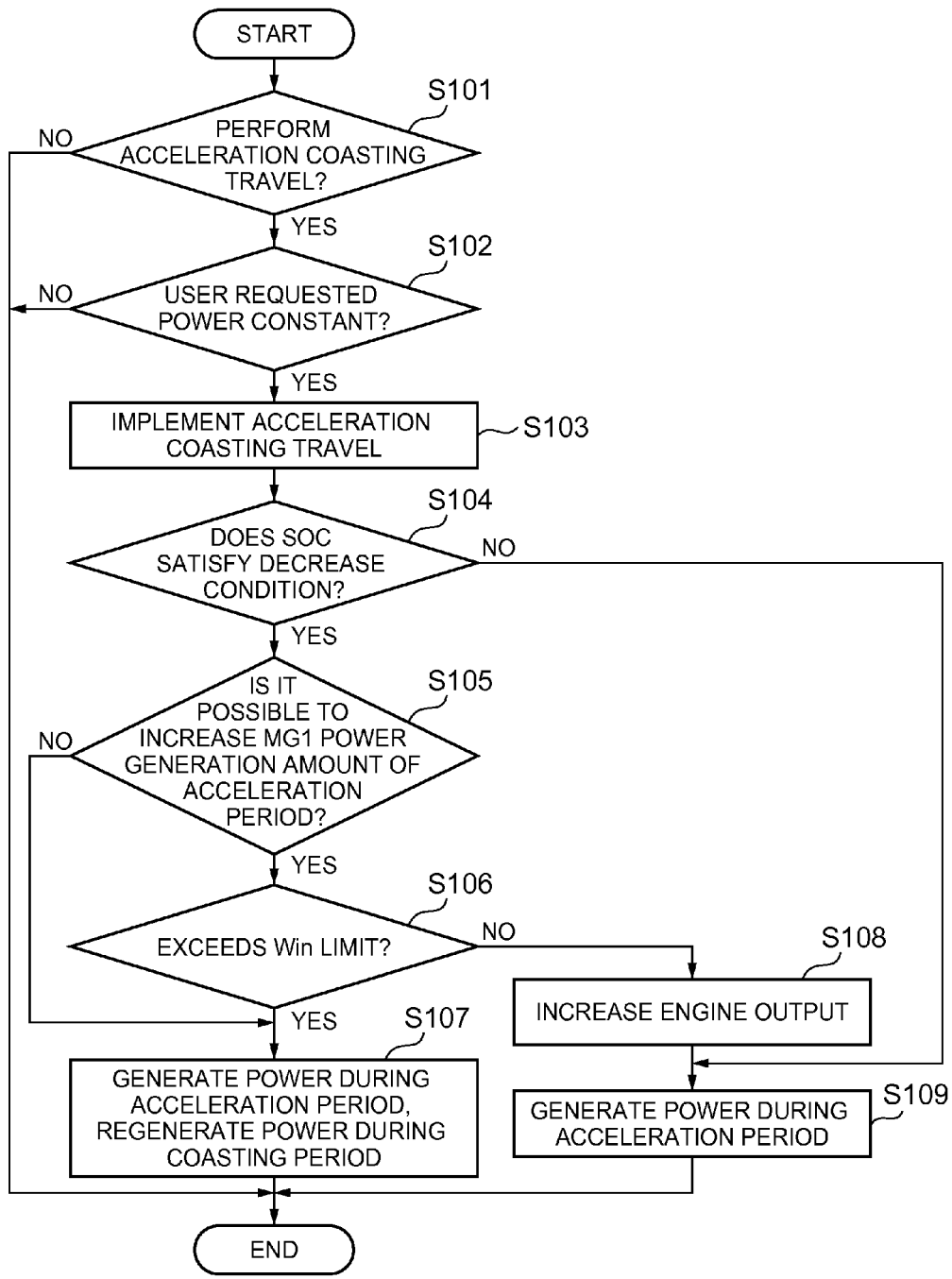
FIG. 2 is a flowchart showing a flow of a first example operation of the hybrid vehicle according to this embodiment (more particularly, a first example operation of the hybrid vehicle during acceleration coasting travel)

First, referring to FIG. 2, the first example operation of the hybrid vehicle 10 (more particularly, the first example operation of the hybrid vehicle 10 during the acceleration coasting travel) will be described. FIG. 2 is a flowchart showing a flow of the first example operation of the hybrid vehicle 10 (more particularly, the first example operation of the hybrid vehicle 10 during the acceleration coasting travel).

As shown in FIG. 2, the first control unit 101 determines whether or not the hybrid vehicle 10 performs the acceleration coasting travel (step S101).

The "acceleration coasting travel" according to this embodiment is travel performed by the hybrid vehicle 10 by alternating repeatedly between acceleration travel and coasting travel such that a vehicle speed of the hybrid vehicle 10 is maintained within a predetermined speed region. In other words, the "acceleration coasting travel" is travel performed by the hybrid vehicle 10 by alternating repeatedly between the acceleration travel and the coasting travel such that the vehicle speed of the hybrid vehicle 10 is maintained at a substantially constant target speed.

During the acceleration travel, the engine ENG is set in an operative condition and the hybrid vehicle 10 travels by power running (typically acceleration) using an engine output of the engine ENG in the operative condition. When the engine ENG is in the operative condition, the engine ENG operates by consuming fuel. As a result, the engine output of the engine ENG is applied to the crankshaft.

During the coasting travel, on the other hand, the engine ENG is set in an inoperative condition and the hybrid vehicle 10 coasts without using the engine output of the engine ENG. When the engine ENG is in the inoperative condition, the engine ENG does not consume fuel. In other words, when the engine ENG is in the inoperative condition, the engine ENG does not operate. As a result, the engine output of the engine ENG is not applied to the crankshaft. In other words, the engine ENG does not apply braking torque corresponding to an engine brake to the crankshaft. In this case, the crankshaft may be idle.

During the acceleration travel, a fuel consumption increases relatively, whereas during the coasting travel, the fuel consumption either decreases relatively or falls to zero. Hence, as long as the reduction in the fuel consumption during the coasting travel exceeds the increase in the fuel consumption during the acceleration travel, the fuel efficiency of the hybrid vehicle 10 during the acceleration coasting travel is superior to the fuel efficiency of the hybrid vehicle 10 when the acceleration coasting travel is not performed.

The first control unit 101 may determine whether or not the hybrid vehicle 10 performs the acceleration coasting travel on the hybrid vehicle 10 by monitoring instructions issued by a user (a driver or a passenger, for example) of the hybrid vehicle 10. For example, the first control unit 101 may determine that the acceleration coasting travel is to be performed in the hybrid vehicle 10 when the user permits acceleration coasting travel by operating an operating button provided in the hybrid vehicle 10. Note, however, that the first control unit 101 may determine whether or not the hybrid vehicle 10 performs the acceleration coasting travel using another method.

When it is determined as a result of the determination of step S101 that the acceleration coasting travel is not to be performed in the hybrid vehicle 10 (step S101: No), the first control unit 101 terminates the operation shown in FIG. 2. In this case, the first control unit 101 may perform the operation of step S101 in FIG. 2 again after a fixed period.

When, on the other hand, it is determined as a result of the determination of step S101 that the acceleration coasting travel is to be performed on the hybrid vehicle 10 (step S101: Yes), the first control unit 101 determines whether or not a power requested by the user in relation to the hybrid vehicle 10 (referred to hereafter as a "user requested power") is substantially constant (step S102). The reason for this is that the acceleration coasting travel, as described above, is performed in the hybrid vehicle 10 by alternating repeatedly between the acceleration travel and the coasting travel such that the vehicle speed is maintained within the predetermined speed region, and therefore, when the user requested power is not constant, the vehicle speed is more likely to vary (in other words, the vehicle speed is less likely to remain within the predetermined speed region), making it difficult for the hybrid vehicle 10 to perform the acceleration coasting travel.

The first control unit 101 may determine whether or not the user requested power is substantially constant on the basis of an amount by which the user operates an accelerator pedal. For example, when the amount by which the user operates the accelerator pedal is substantially constant, the first control unit 101 may determine that the user requested power is substantially constant. Alternatively, the first control unit 101 may determine whether or not the user requested power is substantially constant by determining whether or not auto cruise control, in which the hybrid vehicle 10 is caused to travel automatically at a desired cruising speed, is underway either in addition to or instead of determining whether or not the operation amount of the accelerator pedal is substantially constant. For example, when auto cruise control is underway, the first control unit 101 may determine that the user requested power is substantially constant. Note, however, that the first control unit 101 may determine whether or not the user requested power is substantially constant using another method.

When it is determined as a result of the determination of step S102 that the user requested power is not constant (step S102: No), the first control unit 101 terminates the operation shown in FIG. 2. In this case, the first control unit 101 may perform the operation of step S101 in FIG. 2 again after a fixed period.

When, on the other hand, it is determined as a result of the determination of step S102 that the user requested power is constant (step S102: Yes), the first control unit 101 controls the hybrid vehicle 10 to perform the acceleration coasting travel (step S103).

Figure 3:
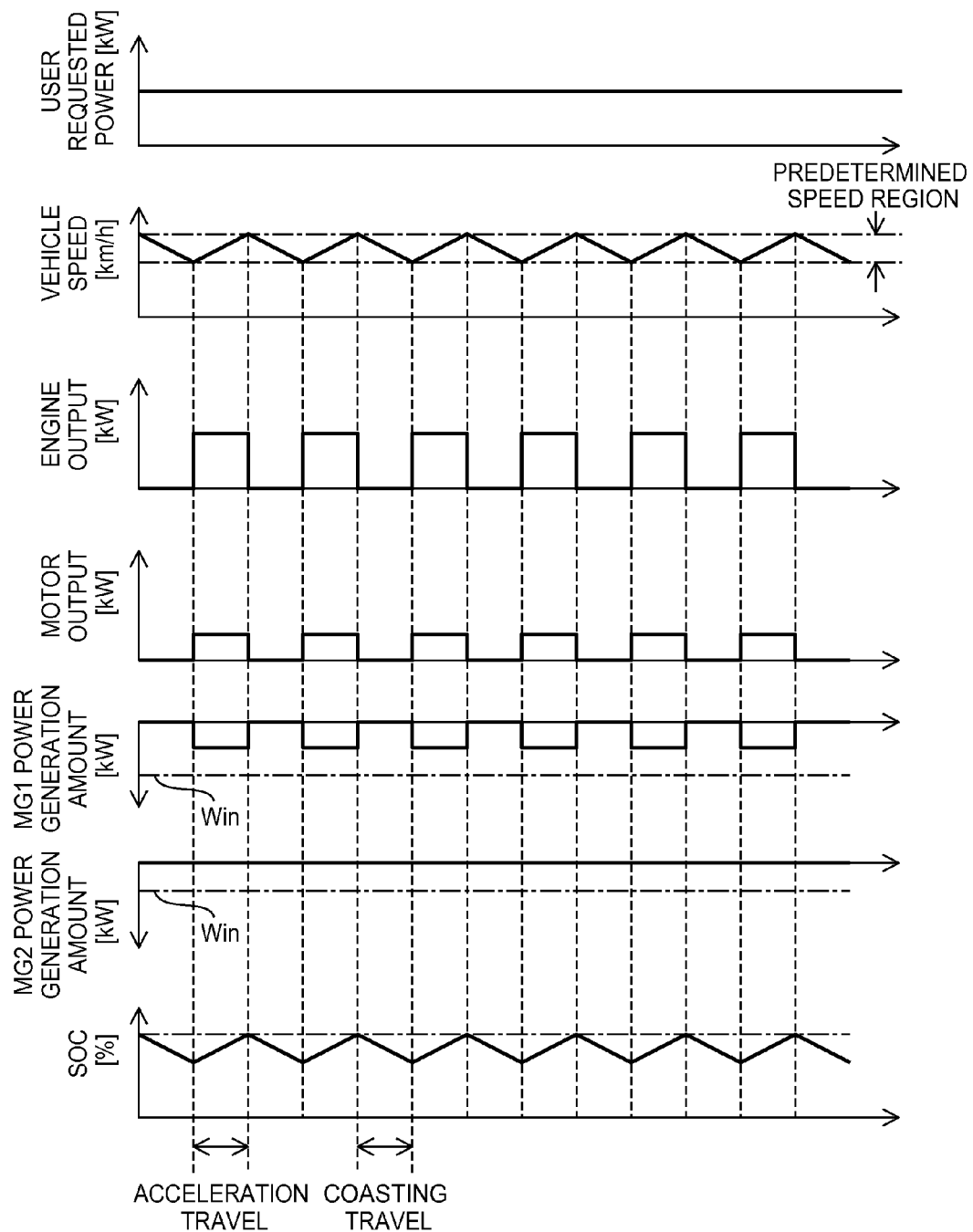
FIG. 3 is a timing chart showing a user requested power, a vehicle speed, an engine output, a motor output, an MG1 power generation amount, an MG2 power generation amount, and a state of charge (SOC) of a battery in a case where the hybrid vehicle performs the acceleration coasting travel.

Here, referring to FIG. 3, the acceleration coasting travel will be described. FIG. 3 is a timing chart showing the user requested power, the vehicle speed, the engine output, a motor output serving as an output of the motor/generator MG2, an MG1 power generation amount serving as an amount of power generated by the motor/generator MG1, an MG2 power generation amount serving as an amount of power generated by (i.e. an amount of power regenerated by) the motor/generator MG2, and an SOC of the battery 500 while the hybrid vehicle 10 performs the acceleration coasting travel.

As shown in FIG. 3, when the user requested power is substantially constant, the hybrid vehicle 10 performs the acceleration coasting travel. In other words, the hybrid vehicle 10 alternates repeatedly between the acceleration travel and the coasting travel such that the vehicle speed is maintained within the predetermined speed region.

More specifically, during an acceleration period in which the hybrid vehicle 10 performs the acceleration travel, the first control unit 101 controls the engine ENG (and also the motor/generators MG1 and MG2) such that the engine ENG is set in the operative condition. Accordingly, the engine ENG outputs a desired engine output during the acceleration period. In addition, the first control unit 101 controls the motor/generator MG2 such that the motor/generator MG2 is driven using the power stored in the battery 500 during the acceleration period. Accordingly, the motor/generator MG2 outputs a desired motor output during the acceleration period.

Note, however, that the first control unit 101 may control the motor/generator MG2 such that the motor/generator MG2 is not driven using the power stored in the battery 500 during the acceleration period. In other words, the first control unit 101 may control the motor/generator MG2 such that during the acceleration period, the motor/generator MG2 rotates idly without using the power stored in the battery 500. As a result, the motor output may fall to zero during the acceleration period.

The motor output and a part of the engine output serve as power used by the hybrid vehicle 10 to perform power running (typically acceleration). As a result, the vehicle speed gradually increases during the acceleration period. Meanwhile, the remaining part of the engine output serves as power for causing the motor/generator MG1 to function as a power generator. In this case, the motor/generator MG1 converts the remaining part of the engine output into electric power under the control of the third control unit 103, which operates in cooperation with the first control unit 101 as required. As a result, the MG1 power generation amount takes a larger value than zero during the acceleration period. The power generated by the motor/generator MG1 is charged to the battery 500. Accordingly, the SOC of the battery 500 increases gradually during the acceleration period.

During a coasting period in which the hybrid vehicle 10 performs the coasting travel, on the other hand, the first control unit 101 controls the engine ENG (and also the motor/generators MG1 and MG2) such that the engine ENG is set in the inoperative condition. As a result, the engine output falls to zero during the coasting period. In addition, the first control unit 101 controls the motor/generator MG2 such that during the coasting period, the motor/generator MG2 rotates idly without using the power stored in the battery 500. As a result, the motor output falls to zero during the coasting period. Accordingly, the vehicle speed gradually decreases during the coasting period.

During the coasting period, the motor/generators MG1 and MG2 do not function as power generators except when an operation to be described in detail below (more specifically, an operation of step S107 in FIG. 2) is performed. Even during the coasting period, however, the power stored in the battery 500 is consumed to drive accessories provided in the hybrid vehicle 10, and therefore the SOC of the battery 500 gradually decreases during the coasting period.

The hybrid vehicle 10 alternates repeatedly between the acceleration travel and the coasting travel described above under the control of the first control unit 101 such that the vehicle speed is maintained within the predetermined speed region. As a result, as shown in FIG. 3, the hybrid vehicle 10 travels at a vehicle speed in the predetermined speed region.

Incidentally, in the example shown in FIG. 3, equilibrium is achieved between an amount of power input into the battery 500 (in other words, a charge amount or an increase in the SOC) during the acceleration period and an amount of power output from the battery 500 (in other words, a discharge amount or a reduction in the SOC) during the coasting period. In the example shown in FIG. 3, therefore, the SOC does not gradually decrease while the hybrid vehicle 10 performs the acceleration coasting travel. In other words, the SOC is maintained within a substantially fixed SOC region while the hybrid vehicle 10 performs the acceleration coasting travel. To put it another way, an average value (typically an average value per unit time) of the SOC remains substantially constant while the hybrid vehicle 10 performs the acceleration coasting travel.

Depending on the travel conditions of the hybrid vehicle 10, however, the increase in the SOC during the acceleration period may fall below the reduction in the SOC during the coasting period. For example, when the MG1 power generation amount is relatively small or an amount of power consumed by the accessories is relatively large during the acceleration period, the increase in the SOC during the acceleration period is relatively more likely to fall below the reduction in the SOC during the coasting period. In this case, the SOC gradually decreases while the hybrid vehicle 10 performs the acceleration coasting travel. In other words, the average value of the SOC gradually decreases while the hybrid vehicle 10 performs the acceleration coasting travel. Accordingly, the SOC deviates from the substantially fixed SOC region while the hybrid vehicle 10 performs the acceleration coasting travel, and as a result, the SOC may decrease excessively (i.e. become excessively small). An excessive reduction in the SOC while the hybrid vehicle 10 performs the acceleration coasting travel may lead to deterioration of the fuel efficiency of the hybrid vehicle 10. Therefore, from the viewpoint of suppressing deterioration of the fuel efficiency while the hybrid vehicle 10 performs the acceleration coasting travel, the SOC is preferably prevented from decreasing excessively when the hybrid vehicle 10 performs the acceleration coasting travel.

Hence, in this embodiment, the second control unit 102 controls the motor/generator MG2 to generate (or in other words to regenerate) power using a kinetic energy of the hybrid vehicle 10 during the coasting period as required so as to prevent the SOC from decreasing excessively while the hybrid vehicle 10 performs the acceleration coasting travel. An operation for controlling the motor/generator MG2 to regenerate power during the coasting period will be described further below.

Referring back to FIG. 2, while the hybrid vehicle 10 performs the acceleration coasting travel, the first control unit 101 determines whether or not the SOC of the battery 500 satisfies a predetermined decrease condition (step S104).

In this embodiment, the predetermined decrease condition is assumed to be satisfied when "a reduction in the SOC per unit time equals or exceeds a first threshold." More particularly, the predetermined decrease condition is preferably set to be satisfied when "the reduction in the SOC per unit time after performing the acceleration travel and the coasting travel at least once each equals or exceeds the first threshold". In other words, the predetermined decrease condition is preferably set to be satisfied when "a reduction in the SOC from the SOC at the start of a certain acceleration travel period to the end of the coasting travel period following the acceleration travel period equals or exceeds the first threshold". The SOC is more likely to have decreased excessively when the SOC satisfies the predetermined decrease condition than when the SOC does not satisfy the predetermined decrease condition.

Note that any condition by which it is possible to determine favorably whether or not an excessive reduction in the SOC is relatively likely to occur or whether or not an excessive reduction in the SOC is relatively likely to have occurred may be used as the predetermined decrease condition. For example, the predetermined decrease condition may be set to be satisfied when the increase in the SOC during the acceleration period is smaller than the reduction in the SOC during the coasting period. Further, for example, the predetermined decrease condition may be set to be satisfied when the SOC (typically the average value of the SOC) decreases over a period required to perform the acceleration travel and the coasting travel at least once each. Further, for example, the predetermined decrease condition may be set to be satisfied when a ratio of the reduction in the SOC during the coasting period relative to the increase in the SOC during the acceleration period equals or exceeds a predetermined ratio greater than one. Further, for example, the predetermined decrease condition may be set to be satisfied when the SOC has decreased excessively (when the SOC falls to or below a second threshold, for example).

When it is determined as a result of the determination of step S104 that the SOC of the battery 500 does not satisfy the predetermined decrease condition (step S104: No), the likelihood of an excessive reduction in the SOC is almost or completely nonexistent. Accordingly, the second control unit 102 need not control the motor/generator MG2 to regenerate power during the coasting period. In other words, the third control unit 103 controls the motor/generator MG1 to generate power using a part of the engine output of the acceleration period (step S109).

When, on the other hand, it is determined as a result of the determination of step S104 that the SOC of the battery 500 satisfies the predetermined decrease condition (step S104: Yes), the likelihood of an excessive reduction in the SOC is relatively high. Hence, measures are preferably taken to suppress an excessive reduction in the SOC.

Incidentally, an excessive reduction in the SOC is suppressed by regenerating power using the motor/generator MG2 during the coasting period, as described above. When power is regenerated by the motor/generator MG2 during the coasting period, however, the coasting period decreases in length. When the coasting period decreases in length, the effect of improving the fuel efficiency by performing the acceleration coasting travel may be weakened or canceled out. Therefore, to maximize the effect of improving the fuel efficiency by performing the acceleration coasting travel, power regeneration by the motor/generator MG2 during the coasting period is preferably avoided as much as possible.

On the other hand, an excessive reduction in the SOC can also be suppressed by increasing the MG1 power generation amount of the acceleration period. Note that here, "increasing the MG1 power generation amount of the acceleration period" means making the MG1 power generation amount of the acceleration period in a case where control is performed to suppress an excessive reduction in the SOC larger than the MG1 power generation amount of the acceleration period in a case where control is not performed to suppress an excessive reduction in the SOC (i.e. increasing the MG1 power generation amount). In this embodiment, therefore, the first control unit 101 first determines whether or not it is possible to suppress an excessive reduction in the SOC by increasing the MG1 power generation amount of the acceleration period. More specifically, the first control unit 101 determines whether or not it is possible to increase the MG1 power generation amount of the acceleration period (step S105). At this time, the first control unit 101 determines whether or not it is possible to increase the MG1 power generation amount of the acceleration period to a point at which the SOC no longer satisfies the predetermined decrease condition (typically a point at which the SOC is maintained within the fixed SOC region or gradually increases) (step S105).

The MG1 power generation amount is determined in accordance with an operating point (an MG1 operating point) of the motor/generator MG1, for example. The MG1 operating point is specified by a rotation speed (an MG1 rotation speed) of the motor/generator MG1 and a torque (an MG1 torque) applied to the rotary shaft of the motor/generator MG1. The MG1 rotation speed and the MG1 torque are determined mainly in accordance with an operating point (an ENG operating point) of the engine ENG. Accordingly, the first control unit 101 may determine whether or not it is possible to modify the MG1 operating point such that the MG1 power generation amount of the acceleration period increases by modifying the ENG operating point. When it is determined that it is possible to modify the MG1 operating point such that the MG1 power generation amount of the acceleration period increases by modifying the ENG operating point, the first control unit 101 may determine that it is possible to increase the MG1 power generation amount during the acceleration period.

The MG1 power generation amount is typically often increased by increasing the engine output. Note that here, "increasing the engine output" means making the engine output (more particularly the engine output of the acceleration period) in a case where control is performed to suppress an excessive reduction in the SOC larger than the engine output (more particularly the engine output of the acceleration period) in a case where control is not performed to suppress an excessive reduction in the SOC (i.e. increasing the engine output). The first control unit 101 may therefore determine whether or not the engine output is allowed to be increased such that the MG1 power generation amount of the acceleration period is increased. When the engine output is allowed to be increased such that the MG1 power generation amount of the acceleration period is increased, the first control unit 101 may determine that the MG1 power generation amount is allowed to be increased during the acceleration period.

When it is determined as a result of the determination of step S105 that it is possible to increase the MG1 power generation amount during the acceleration period (step S105: Yes), the first control unit 101 further determines whether or not the increased MG1 power generation amount exceeds an upper limit value (a so-called Win limit value) of an amount of power that can be input into the battery 500 (step S106). In other words, the first control unit 101 determines whether or not the MG1 power generation amount exceeds the Win limit value after being increased to the point at which the SOC no longer satisfies the predetermined decrease condition (step S106).

When it is determined as a result of the determination of step S106 that the increased MG1 power generation amount does not exceed (i.e. is not larger than) the Win limit value (step S106: No), this means that all of the power generated by the motor/generator MG1 during the acceleration period (excluding power that is lost) can be input into the battery 500 even after the MG1 power generation amount is increased to the point at which the SOC no longer satisfies the predetermined decrease condition. In other words, an excessive reduction in the SOC is suppressed favorably using the power generated by the motor/generator MG1 during the acceleration period. Accordingly, the second control unit 102 need not control the motor/generator MG2 to regenerate power during the coasting period. In this case, the third control unit 103 increases the MG1 power generation amount by controlling the engine ENG so as to increase the engine output of the acceleration period (or vary the operating point of the engine ENG) (step S108). As a result, the MG1 power generation amount of the acceleration period increases. Furthermore, the third control unit 103 controls the motor/generator MG1 to generate power using a part of the engine output (i.e. the increased engine output) during the acceleration period (step S109).

When, on the other hand, it is determined as a result of the determination of step S106 that the increased MG1 power generation amount exceeds (i.e. is larger than) the Win limit value (step S106: Yes), this means that a part of the power generated by the motor/generator MG1 during the acceleration period is not input into the battery 500 after the MG1 power generation amount is increased to the point at which the SOC no longer satisfies the predetermined decrease condition. In other words, an excessive reduction in the SOC is not suppressed favorably using only the power generated by the motor/generator MG1 during the acceleration period. In this case, therefore, the third control unit 103 controls the motor/generator MG1 to generate power during the acceleration period, and in addition, the second control unit 102 controls the motor/generator MG2 to regenerate power during the coasting period (step S107).

Note that in order to minimize the reduction in the length of the coasting period when the motor/generator MG2 is controlled to regenerate power during the coasting period, the second control unit 102 may control the motor/generator MG2 so as to minimize the MG2 power generation amount of the coasting period. For example, the third control unit 103 may maximize the MG1 power generation amount while ensuring that the increased MG1 power generation amount does not exceed the Win limit value. In other words, the third control unit 103 may control the engine ENG so as to increase the engine output of the acceleration period (or vary the operating point of the engine ENG) to a point at which the MG1 power generation amount of the acceleration period is maximized. As a result, the MG1 power generation amount of the acceleration period is maximized. Further, the second control unit 102 may control the motor/generator MG2 such that a deficiency in the MG1 power generation amount of the acceleration period due to the Win limit value is compensated for by the MG2 power generation amount of the coasting period. In other words, the second control unit 102 may control the motor/generator MG2 such that an amount of power that matches the deficiency in the MG1 power generation amount of the acceleration period due to the Win limit value is regenerated by the motor/generator MG2 during the coasting period.

When, on the other hand, it is determined as a result of the determination of step S105 that it is not possible to increase the MG1 power generation amount during the acceleration period (step S105: No), this means that an excessive reduction in the SOC cannot easily be suppressed using only the MG1 power generation amount of the acceleration period.

Accordingly, the third control unit 103 controls the motor/generator MG1 to generate power during the acceleration period, and in addition, the second control unit 102 controls the motor/generator MG2 to regenerate power during the coasting period (step S107). Note, however, that since it is determined in this case that it is not possible to increase the MG1 power generation amount (typically that it is not possible to increase the engine output) during the acceleration period, the third control unit 103 need not increase the engine output of the acceleration period to the point at which the MG1 power generation amount of the acceleration period is maximized.

The second control unit 102 may control the motor/generator MG2 to continue to regenerate power during the coasting period as long as the SOC remains in a relatively reduced condition. For example, the second control unit 102 may control the motor/generator MG2 to continue to regenerate power during the coasting period until the SOC equals or exceeds a third threshold. At the point where the SOC equals or exceeds the third threshold, the second control unit 102 may control the motor/generator MG2 to stop regenerating power during the coasting period. Thereafter, the second control unit 102 controls the motor/generator MG2 to regenerate power during the coasting period again when the SOC is again determined to satisfy the predetermined decrease condition.

Figure 4:
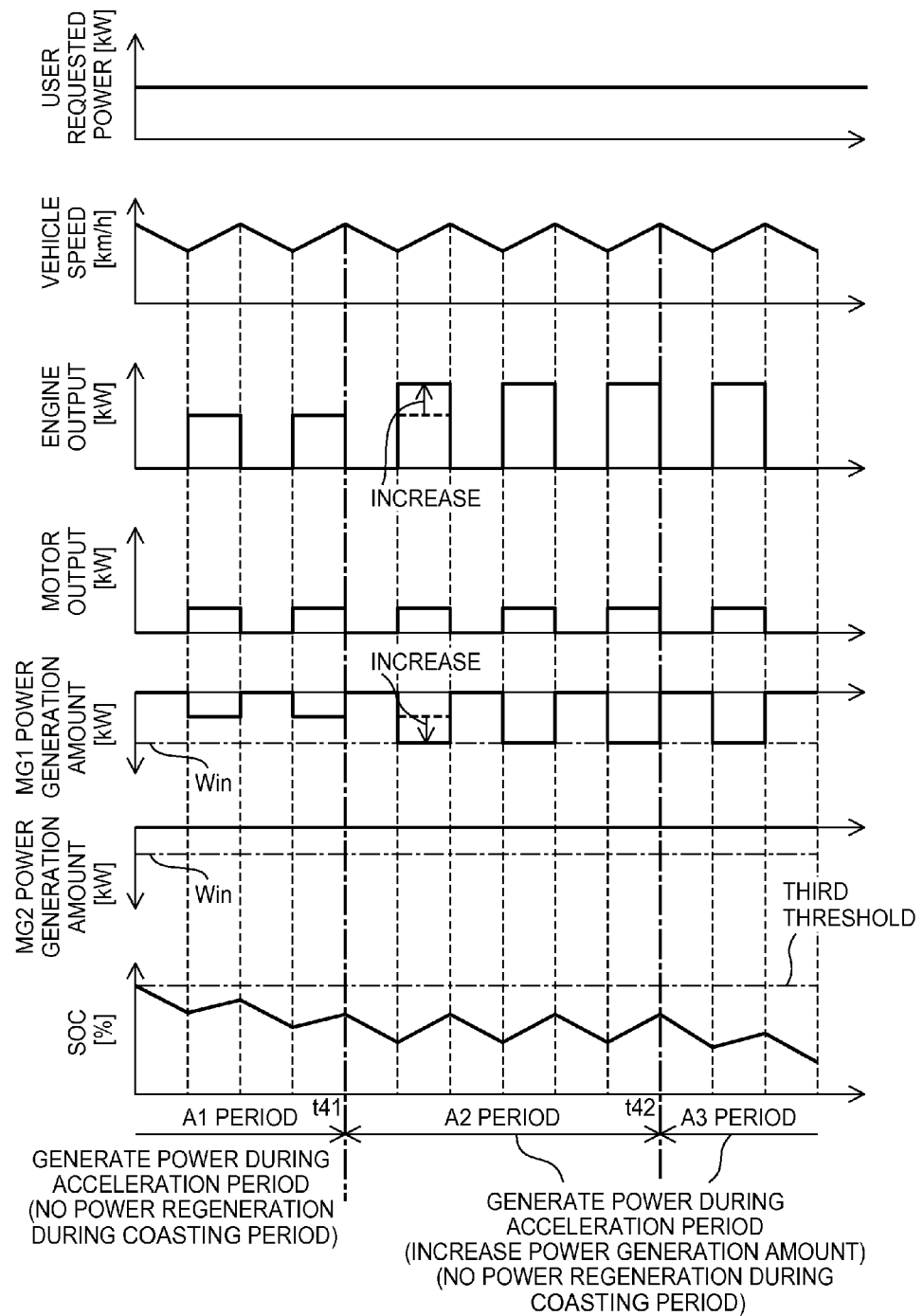
FIG. 4 is a timing chart showing the user requested power, the vehicle speed, the engine output, the motor output, the MG1 power generation amount, the MG2 power generation amount, and the SOC of the battery in a case where an excessive reduction in the SOC is suppressed by increasing the MG1 power generation amount in accordance with the first example operation.
Figure 5:
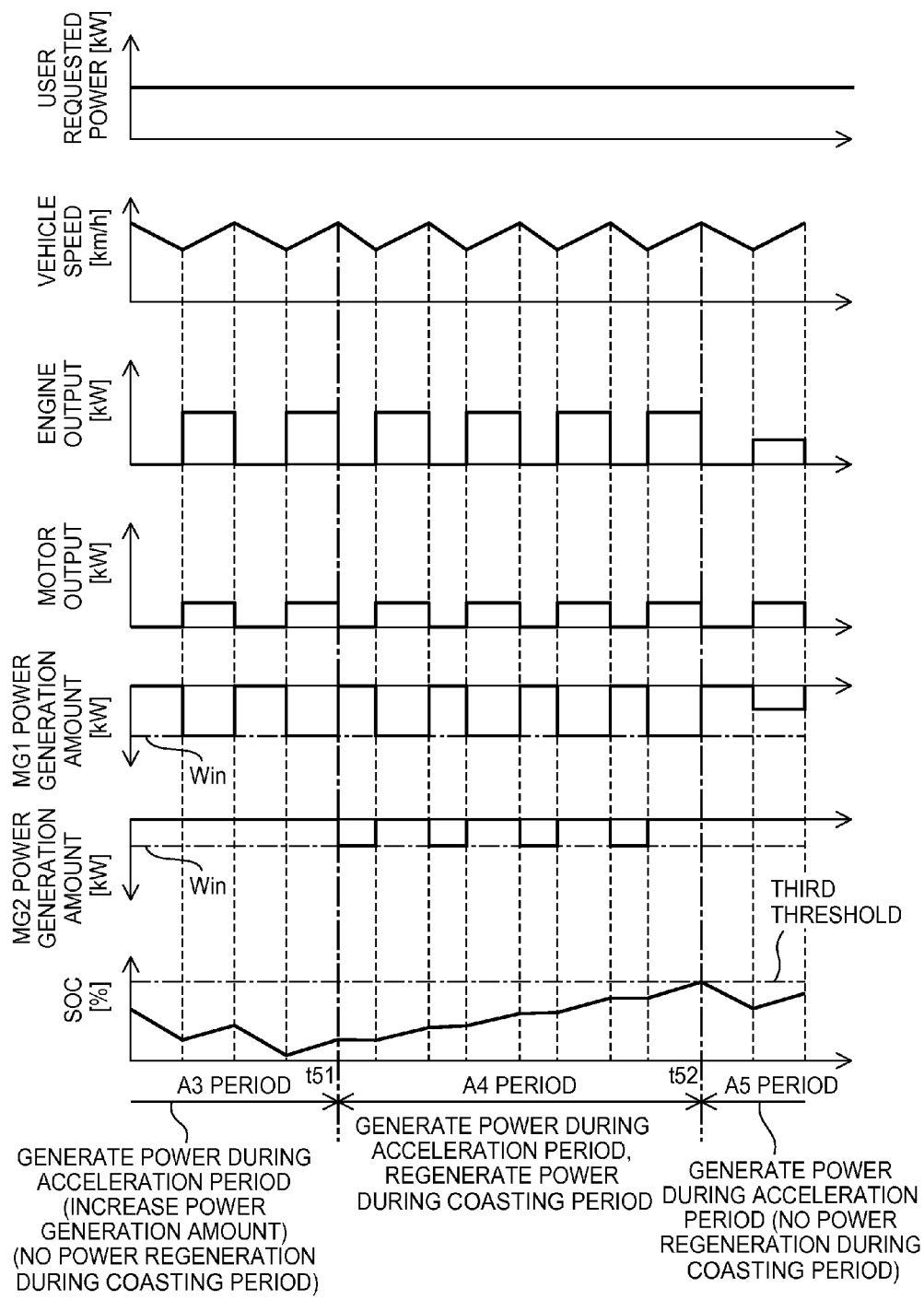
FIG. 5 is a first example of a timing chart showing the user requested power, the vehicle speed, the engine output, the motor output, the MG1 power generation amount, the MG2 power generation amount, and the SOC of the battery in a case where an excessive reduction in the SOC is suppressed by regenerating power using a motor/generator MG2 during a coasting period in accordance with the first example operation.
Figure 6:
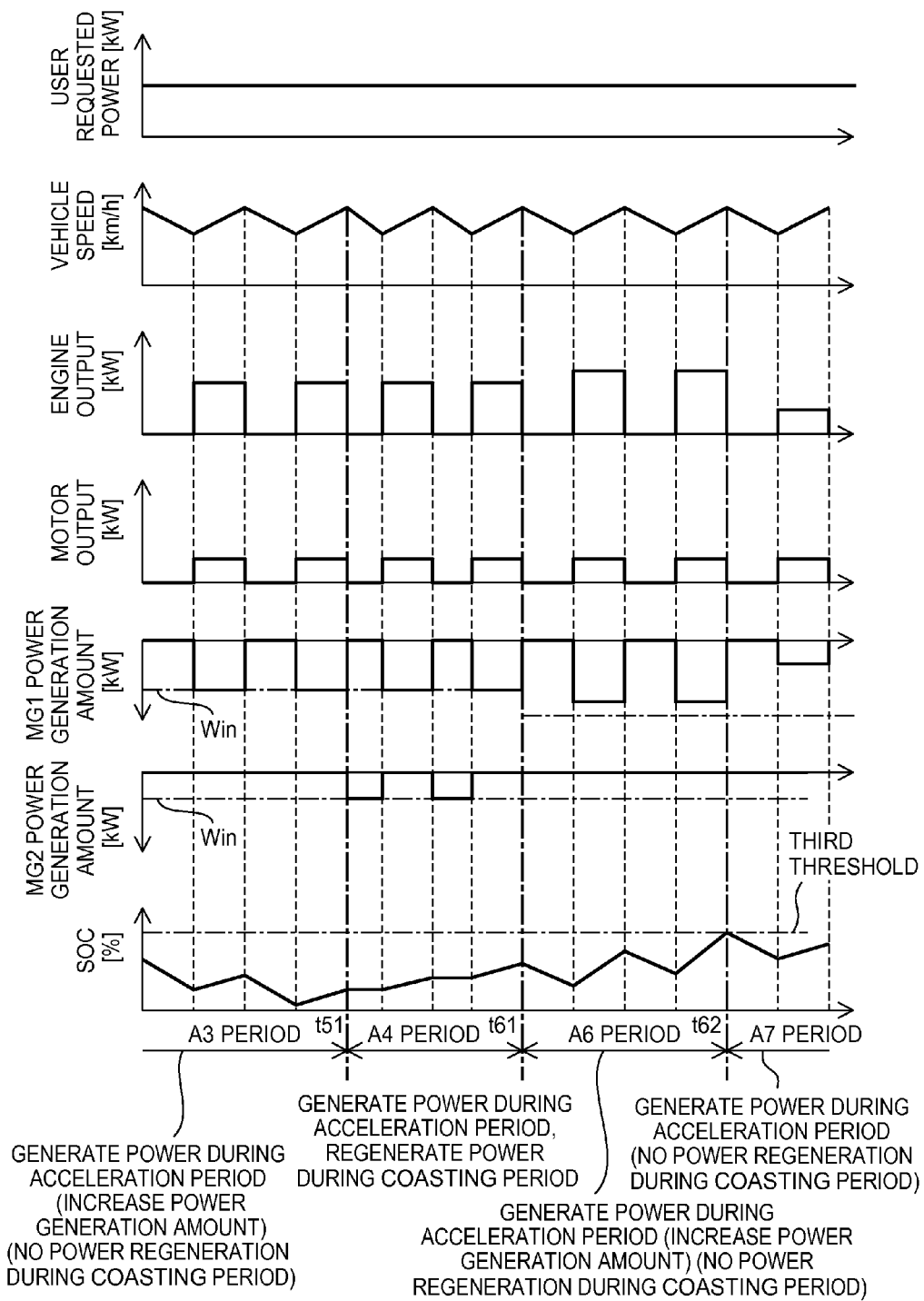
FIG. 6 is a second example of a timing chart showing the user requested power, the vehicle speed, the engine output, the motor output, the MG1 power generation amount, the MG2 power generation amount, and the SOC of the battery in a case where an excessive reduction in the SOC is suppressed by regenerating power using the motor/generator MG2 during the coasting period in accordance with the first example operation.

Here, referring to FIGS. 4 to 6, the manner in which an excessive reduction in the SOC is suppressed by the first example operation will be described in further detail. FIG. 4 is a timing chart showing the user requested power, the vehicle speed, the engine output, the motor output serving as the output of the motor/generator MG2, the MG1 power generation amount serving as the amount of power generated by the motor/generator MG1, the MG2 power generation amount serving as the amount of power generated by (i.e. the amount of power regenerated by) the motor/generator MG2, and the SOC of the battery 500 in a case where an excessive reduction in the SOC is suppressed by increasing the MG1 power generation amount in accordance with the first example operation. FIG. 5 is a first example of a timing chart showing the user requested power, the vehicle speed, the engine output, the motor output serving as the output of the motor/generator MG2, the MG1 power generation amount serving as the amount of power generated by the motor/generator MG1, the MG2 power generation amount serving as the amount of power generated by (i.e. the amount of power regenerated by) the motor/generator MG2, and the SOC of the battery 500 in a case where an excessive reduction in the SOC is suppressed by regenerating power using the motor/generator MG2 during the coasting period in accordance with the first example operation. FIG. 6 is a second example of a timing chart showing the user requested power, the vehicle speed, the engine output, the motor output serving as the output of the motor/generator MG2, the MG1 power generation amount serving as the amount of power generated by the motor/generator MG1, the MG2 power generation amount serving as the amount of power generated by (i.e. the amount of power regenerated by) the motor/generator MG2, and the SOC of the battery 500 in a case where an excessive reduction in the SOC is suppressed by regenerating power using the motor/generator MG2 during the coasting period in accordance with the first example operation.

As shown in FIG. 4, the SOC is determined to satisfy the predetermined decrease condition at a time t41. In other words, the SOC is determined not to satisfy the predetermined decrease condition over an A1 period extending to the time t41. Over the A1 period extending to the time t41, therefore, the third control unit 103 controls the motor/generator MG1 to generate power during the acceleration period, but the second control unit 102 does not control the motor/generator MG2 to regenerate power during the coasting period. Accordingly, as shown in FIG. 4, the MG1 power generation amount of the acceleration period increases from zero while the MG2 power generation amount of the coasting period remains at zero. As a result, the SOC gradually decreases.

After determining that the SOC satisfies the predetermined decrease condition at the time t41, it is determined that it is possible to increase the MG1 power generation amount and that the increased MG1 power generation amount does not exceed the Win limit value. In this case, over an A2 period starting from the time t41, the third control unit 103 increases the engine output of the acceleration period and controls the motor/generator MG1 to generate power during the acceleration period. Accordingly, the MG1 power generation amount of the acceleration period increases in response to the increase in the engine output of the acceleration period. Note that FIG. 4 shows an example in which the MG1 power generation amount of the acceleration period is maximized to a value matching the Win limit value. On the other hand, the second control unit 102 does not control the motor/generator MG2 to regenerate power during the coasting period. Therefore, although the SOC decreases at an almost unvarying speed during the coasting period, the SOC increases at an increased speed during the acceleration period. As a result, the reduction in the SOC is suppressed. FIG. 4 shows an example in which equilibrium is achieved between the speed at which the SOC increases during the acceleration period and the speed at which the SOC decreases during the coasting period as a result of the increase in the MG1 power generation amount.

Meanwhile, at a time t42, the power consumption of the accessories increases. Hence, over an A3 period starting from the time t42, the speed at which the SOC increases during the acceleration period decreases and the speed at which the SOC decreases during the coasting period increases in comparison with the A2 period. As a result, the SOC gradually decreases.

At a time t51 in FIG. 5, which illustrates a first example of the timing chart following on from the timing chart of FIG. 4, the SOC is determined to satisfy the predetermined decrease condition. However, the MG1 power generation amount already matches the Win limit value at the time t51, and therefore, when the MG1 power generation amount is increased to the point at which the SOC no longer satisfies the predetermined decrease condition, the increased MG1 power generation amount exceeds the Win limit value. Hence, over an A4 period starting from the time t51, the third control unit 103 controls the motor/generator MG1 to generate power during the acceleration period, and the second control unit 102 controls the motor/generator MG2 to regenerate power during the coasting period. Accordingly, the MG1 power generation amount of the acceleration period increases from zero, and in addition, the MG2 power generation amount of the coasting period likewise increases from zero. Therefore, the speed at which the SOC decreases during the coasting period decreases, or in other words the SOC continues to increase even during the coasting period. As a result, the SOC gradually increases.

Note that when the motor/generator MG2 regenerates power during the coasting period, as shown in FIG. 5, the length of the coasting period decreases in comparison with a case where the motor/generator MG2 does not regenerate power during the coasting period.

Next, at a time t52, the SOC is determined to equal or exceed the third threshold, which is indicated by a dot-dash line. Hence, at the time t52, the second control unit 102 controls the motor/generator MG2 to stop regenerating power during the coasting period. Accordingly, over an A5 period starting from the time t52, the third control unit 103 controls the motor/generator MG1 to generate power during the acceleration period, but the second control unit 102 does not control the motor/generator MG2 to regenerate power during the coasting period. Further, at the time t52, the third control unit 103 may reduce the engine output and the MG1 power generation amount that were increased during the acceleration period (or in other words return the engine output and the MG1 power generation amount to their original values).

Alternatively, as shown in FIG. 6, which illustrates a second example of the timing chart following on from the timing chart of FIG. 4, the Win limit value may increase over the A4 period in which the motor/generator MG2 regenerates power during the coasting period. For example, the Win limit value may increase when a temperature of the battery 500 decreases. FIG. 6 shows an example in which the Win limit value increases at a time t61 before the SOC is determined to equal or exceed the third threshold indicated by the dot-dash line. As a result, it may be determined anew that it is possible to increase the MG1 power generation amount of the acceleration period within a range not exceeding the Win limit value. When it is determined anew that it is possible to increase the MG1 power generation amount within a range not exceeding the Win limit value, the third control unit 103 can increase the MG1 power generation amount of the acceleration period further by further increasing the engine output of the acceleration period. Accordingly, the speed at which the SOC increases during the acceleration period increases further, and as a result, the reduction in the SOC is suppressed. Moreover, once the reduction in the SOC has been suppressed by further increasing the MG1 power generation amount, the second control unit 102 controls the motor/generator MG2 to stop regenerating power during the coasting period. Therefore, during an A6 period starting from the time t61, the third control unit 103 controls the motor/generator MG1 to generate power during the acceleration period but the second control unit 102 does not control the motor/generator MG2 to regenerate power during the coasting period.

Next, at a time t62, the SOC is determined to equal or exceed the third threshold indicated by the dot-dash line. In this case, the third control unit 103 may reduce the engine output and the MG1 power generation amount that were increased during the acceleration period (or in other words return the engine output and the MG1 power generation amount to their original values) over an A7 period starting from the time t62.

As described above, by implementing the first example operation on the hybrid vehicle 10 according to this embodiment, the battery 500 can be charged under the control of the ECU 100 (more particularly the first to third control units 101 to 103) during both the acceleration period and the coasting period. Accordingly, a reduction in the SOC of the battery 500 as the hybrid vehicle 10 alternates repeatedly between the acceleration travel and the coasting travel is suppressed (or prevented) favorably. Hence, an excessive reduction in the SOC is also suppressed favorably. As a result, deterioration of the fuel efficiency of the hybrid vehicle 10 due to an excessive reduction in the SOC is suppressed favorably.

Since an excessive reduction in the SOC is suppressed, the likelihood that the acceleration coasting travel will be terminated in the hybrid vehicle 10 in a condition where the SOC has decreased excessively, for example, is almost or completely nonexistent. In other words, the value of the SOC is relatively large at the point where the acceleration coasting travel is terminated in the hybrid vehicle 10. After the acceleration coasting travel is terminated, therefore, the hybrid vehicle 10 can travel using the motor output of the motor/generator MG2 with the engine ENG set in the inoperative condition. In other words, the hybrid vehicle 10 can travel as a so-called EV. As a result, deterioration of the fuel efficiency due to being unable to perform EV travel is suppressed favorably.

Moreover, since an excessive reduction in the SOC is suppressed, the likelihood that the acceleration coasting travel will be terminated in the hybrid vehicle 10 in a condition where the SOC has decreased excessively, for example, is almost or completely nonexistent. In other words, the value of the SOC is relatively large at the point where the acceleration coasting travel is terminated in the hybrid vehicle 10. After the acceleration coasting travel is terminated in the hybrid vehicle 10, therefore, the engine ENG does not have to be set in the operative condition merely to increase the SOC. As a result, deterioration of the fuel efficiency caused by setting the engine ENG in the operative condition merely to increase the SOC is suppressed favorably.

Further, the hybrid vehicle 10 switches the engine ENG from the inoperative condition to the operative condition by cranking the engine ENG using the motor/generator MG1 for example, in order to perform the acceleration travel following the coasting travel. In a condition where the SOC has decreased excessively, it may be difficult to crank the internal combustion engine using the motor/generator MG1. Since an excessive reduction in the SOC is suppressed in the manner described above, however, the likelihood that it will be difficult to crank the engine ENG using the motor/generator MG1 is almost or completely nonexistent. The hybrid vehicle 10 can therefore perform the acceleration coasting travel continuously. In other words, the hybrid vehicle 10 can continue the acceleration coasting travel over a relatively long period. As a result, deterioration of the fuel efficiency due to difficulty in continuing the acceleration coasting travel is suppressed favorably.

In addition, the hybrid vehicle 10 performs power regeneration using the motor/generator MG2 during the coasting period selectively under the control of the second control unit 102 when the SOC satisfies the predetermined decrease condition (for example, when a reduction in the SOC that may cause the fuel efficiency to deteriorate occurs). In other words, when the SOC does not satisfy the predetermined decrease condition, the hybrid vehicle 10 need not perform power regeneration using the motor/generator MG2 during the coasting period. Hence, with the hybrid vehicle 10, power regeneration using the motor/generator MG2 during the coasting period can be avoided as much as possible. As a result, an excessive reduction in the length of the coasting period that may occur as a result of power regeneration by the motor/generator MG2 during the coasting period is suppressed while also favorably suppressing deterioration of the fuel efficiency of the hybrid vehicle 10 due to an excessive reduction in the SOC.

Moreover, the hybrid vehicle 10 performs power regeneration using the motor/generator MG2 during the coasting period selectively under the control of the second control unit 102 when it is possible to increase the MG1 power generation amount during the acceleration period. In other words, when it is possible to increase the MG1 power generation amount during the acceleration period, the hybrid vehicle 10 need not perform power regeneration using the motor/generator MG2 during the coasting period. Hence, with the hybrid vehicle 10, power regeneration using the motor/generator MG2 during the coasting period can be avoided as much as possible. As a result, an excessive reduction in the length of the coasting period that may occur as a result of power regeneration by the motor/generator MG2 during the coasting period is suppressed while also favorably suppressing deterioration of the fuel efficiency of the hybrid vehicle 10 due to an excessive reduction in the SOC.

Furthermore, the hybrid vehicle 10 performs power regeneration using the motor/generator MG2 during the coasting period selectively under the control of the second control unit 102 when the MG1 power generation amount exceeds the Win limit value after being increased. In other words, as long as the MG1 power generation amount does not exceed the Win limit value after being increased, the hybrid vehicle 10 need not perform power regeneration using the motor/generator MG2 during the coasting period. Hence, with the hybrid vehicle 10, power regeneration using the motor/generator MG2 during the coasting period can be avoided as much as possible. As a result, an excessive reduction in the length of the coasting period that may occur as a result of power regeneration by the motor/generator MG2 during the coasting period is suppressed while also favorably suppressing deterioration of the fuel efficiency of the hybrid vehicle 10 due to an excessive reduction in the SOC.

Next, referring to FIG. 7, a second example operation of the hybrid vehicle 10 (more particularly, a second example operation of the hybrid vehicle 10 during the acceleration coasting travel) will be described. FIG. 7 is a flowchart showing a flow of the second example operation of the hybrid vehicle 10 (more particularly, the second example operation of the hybrid vehicle 10 during the acceleration coasting travel). Note that in the following description, identical operations to the first example operation have been allocated identical step numbers, and detailed description thereof has been omitted.

As shown in FIG. 7, the second example operation differs from the first example operation in that when it is determined to be possible to increase the MG1 power generation amount during the acceleration period (step S105: Yes) in the first example operation, a determination is made as to whether or not the increased MG1 power generation amount exceeds the Win limit value, whereas when it is determined to be possible to increase the MG1 power generation amount during the acceleration period (step S105: Yes) in the second example operation, a determination is made as to whether or not a powertrain efficiency deteriorates (reduces) by at least a predetermined amount (step S206). All other operations of the second example operation may be identical to the other operations of the first example operation.

More specifically, when, in the second example operation, it is determined as a result of the determination of step S105 to be possible to increase the MG1 power generation amount during the acceleration period (step S105: Yes), the first control unit 101 further determines whether or not the powertrain efficiency of the hybrid vehicle 10 deteriorates by at least a fourth threshold after the engine output is increased in order to increase the MG1 power generation amount during the acceleration period in comparison with the powertrain efficiency before the engine output is increased (step S206). Note that here, the "powertrain efficiency" denotes an overall operation efficiency of a transmission system used to transmit power from the engine ENG and the motor/generators MG1 and MG2 to the vehicle wheels 12.

When it is determined as a result of the determination of step S206 that the powertrain efficiency does not deteriorate by at least the fourth threshold (step S206: No), a similar operation to the operation performed in the first example operation after determining that the increased MG1 power generation amount does not exceed the Win limit value is performed. More specifically, the second control unit 102 need not control the motor/generator MG2 to regenerate power during the coasting period. In this case, the third control unit 103 controls the engine ENG so as to increase the engine output of the acceleration period (or vary the operating point of the engine ENG) (step S108). As a result, the MG1 power generation amount of the acceleration period increases. Further, the third control unit 103 controls the motor/generator MG1 to generate power using a part of the engine output (i.e. the increased engine output) during the acceleration period (step S109).

When, on the other hand, it is determined as a result of the determination of step S206 that the powertrain efficiency deteriorates by at least the fourth threshold (step S206: Yes), a similar operation to the operation performed in the first example operation after determining that the increased MG1 power generation amount exceeds the Win limit value is performed. More specifically, the third control unit 103 controls the motor/generator MG1 to generate power during the acceleration period, and in addition, the second control unit 102 controls the motor/generator MG2 to regenerate power during the coasting period (step S107).

Here, referring to FIGS. 8 to 10, the manner in which an excessive reduction in the SOC is suppressed by the second example operation will be described. FIG. 8 is a timing chart showing the user requested power, the vehicle speed, the engine output, the motor output serving as the output of the motor/generator MG2, the MG1 power generation amount serving as the amount of power generated by the motor/generator MG1, the MG2 power generation amount serving as the amount of power generated by (i.e. the amount of power regenerated by) the motor/generator MG2, and the SOC of the battery 500 in a case where an excessive reduction in the SOC is suppressed by increasing the MG1 power generation amount in accordance with the second example operation. FIG. 9 is a first example of a timing chart showing the user requested power, the vehicle speed, the engine output, the powertrain efficiency, the motor output serving as the output of the motor/generator MG2, the MG1 power generation amount serving as the amount of power generated by the motor/generator MG1, the MG2 power generation amount serving as the amount of power generated by (i.e. the amount of power regenerated by) the motor/generator MG2, and the SOC of the battery 500 in a case where an excessive reduction in the SOC is suppressed by regenerating power using the motor/generator MG2 during the coasting period in accordance with the second example operation. FIG. 10 is a second example of a timing chart showing the user requested power, the vehicle speed, the engine output, the motor output serving as the output of the motor/generator MG2, the MG1 power generation amount serving as the amount of power generated by the motor/generator MG1, the MG2 power generation amount serving as the amount of power generated by (i.e. the amount of power regenerated by) the motor/generator MG2, and the SOC of the battery 500 in a case where an excessive reduction in the SOC is suppressed by regenerating power using the motor/generator MG2 during the coasting period in accordance with the second example operation.

As shown in FIG. 8, the SOC is determined to satisfy the predetermined decrease condition at a time t81. In other words, the SOC is determined not to satisfy the predetermined decrease condition over a B1 period extending to the time t81. Over the period extending to the time t81, therefore, the third control unit 103 controls the motor/generator MG1 to generate power during the acceleration period, but the second control unit 102 does not control the motor/generator MG2 to regenerate power during the coasting period. Accordingly, the MG1 power generation amount of the acceleration period increases from zero while the MG2 power generation amount of the coasting period remains at zero. As a result, the SOC gradually decreases.

After determining that the SOC satisfies the predetermined decrease condition at the time t81, it is further determined that it is possible to increase the MG1 power generation amount and that the powertrain efficiency does not deteriorate by at least the fourth threshold. In this case, over a B2 period starting from the time t81, the third control unit 103 increases the engine output of the acceleration period and controls the motor/generator MG1 to generate power during the acceleration period. Accordingly, the MG1 power generation amount of the acceleration period increases in response to the increase in the engine output of the acceleration period. Note that FIG. 8 shows an example in which the MG1 power generation amount of the acceleration period is maximized to a value matching the Win limit value. On the other hand, the second control unit 102 does not control the motor/generator MG2 to regenerate power during the coasting period. Therefore, although the SOC decreases at an almost unvarying speed during the coasting period, the SOC increases at an increased speed during the acceleration period. As a result, the reduction in the SOC is suppressed. FIG. 8 shows an example in which equilibrium is achieved between the speed at which the SOC increases during the acceleration period and the speed at which the SOC decreases during the coasting period as a result of the increase in the MG1 power generation amount.

Meanwhile, at a time t82, the power consumption of the accessories increases. Hence, over a B3 period starting from the time t82, the speed at which the SOC increases during the acceleration period decreases and the speed at which the SOC decreases during the coasting period increases in comparison with the B2 period. As a result, the SOC gradually decreases.

At a time t91 in FIG. 9, which illustrates a first example of the timing chart following on from the timing chart of FIG. 8, the SOC is determined to satisfy the predetermined decrease condition. Here, it is determined that after the engine output is increased further at the time t91 in order to increase the MG1 power generation amount further, the powertrain efficiency deteriorates by at least the fourth threshold at a point following the time t91 in comparison with the powertrain efficiency prior to the time t81 at which the engine output is increased. Note that in FIG. 9, the increased engine output and the deteriorated powertrain efficiency are denoted by thick dotted lines. Hence, over a B4 period starting from the time t91, the third control unit 103 controls the motor/generator MG1 to generate power during the acceleration period without further increasing the engine output during the acceleration period, as shown by a thick solid line in FIG. 9, and the second control unit 102 controls the motor/generator MG2 to regenerate power during the coasting period. Accordingly, the MG1 power generation amount of the acceleration period increases from zero, and in addition, the MG2 power generation amount of the coasting period likewise increases from zero. Therefore, the speed at which the SOC decreases during the coasting period decreases, or in other words the SOC continues to increase even during the coasting period. As a result, the SOC gradually increases. Furthermore, since the engine output is not increased further during the acceleration period, the powertrain efficiency does not deteriorate (more particularly, does not deteriorate by at least the fourth threshold) during the acceleration period, as shown by the thick solid line in FIG. 9.

Next, at a time t92, the SOC is determined to equal or exceed the third threshold, which is indicated by a dot-dash line. Hence, at the time t92, the second control unit 102 controls the motor/generator MG2 to stop regenerating power during the coasting period. Accordingly, over a B5 period starting from the time t92, the third control unit 103 controls the motor/generator MG1 to generate power during the acceleration period, but the second control unit 102 does not control the motor/generator MG2 to regenerate power during the coasting period. Further, at the time t92, the third control unit 103 may reduce the engine output and the MG1 power generation amount that were increased during the acceleration period (or in other words return the engine output and the MG1 power generation amount to their original values).

Alternatively, as shown in FIG. 10, which illustrates a second example of the timing chart following on from the timing chart of FIG. 8, it may be determined anew that for some reason, the powertrain efficiency does not deteriorate by at least the fourth threshold in the B4 period, in which the motor/generator MG2 regenerates power during the coasting period, even after the engine output is increased further in order to increase the MG1 power generation amount further. FIG. 10 shows an example in which it is determined anew, at a time t101 before the SOC is determined to equal or exceed the third threshold indicated by the dot-dash line, that the powertrain efficiency does not deteriorate by at least the fourth threshold even after the engine output is increased further in order to increase the MG1 power generation amount further. When it is determined anew that the powertrain efficiency does not deteriorate by at least the fourth threshold, the third control unit 103 can further increase the MG1 power generation amount of the acceleration period by further increasing the engine output of the acceleration period. Accordingly, the speed at which the SOC increases during the acceleration period increases further, and as a result, the reduction in the SOC is suppressed. Moreover, once the reduction in the SOC has been suppressed by further increasing the MG1 power generation amount, the second control unit 102 controls the motor/generator MG2 to stop regenerating power during the coasting period. Therefore, over a B6 period starting from the time t101, the third control unit 103 controls the motor/generator MG1 to generate power during the acceleration period, but the second control unit 102 does not control the motor/generator MG2 to regenerate power during the coasting period.

Next, at a time t102, the SOC is determined to equal or exceed the third threshold indicated by the dot-dash line. In this case, the third control unit 103 may reduce the engine output and the MG1 power generation amount that were increased during the acceleration period (or in other words return the engine output and the MG1 power generation amount to their original values) over a B7 period starting from the time t102.

As described above, by implementing the second example operation on the hybrid vehicle 10 according to this embodiment, the various effects obtained by implementing the first example operation can be obtained equally favorably. In addition, in the second example operation, deterioration (more particularly, excessive deterioration) of the powertrain efficiency is suppressed favorably. As a result, deterioration of the fuel efficiency of the hybrid vehicle 10 due to deterioration of the powertrain efficiency is suppressed favorably while also favorably suppressing deterioration of the fuel efficiency of the hybrid vehicle 10 due to an excessive reduction in the SOC.

Note that in addition to, or instead of, determining whether or not the powertrain efficiency deteriorates by at least the fourth threshold, the first control unit 101 may determine whether or not an operating efficiency of the engine ENG deteriorates by at least a fifth threshold after the engine output is increased such that the MG1 power generation amount during the acceleration period is increased in comparison with the operating efficiency before the increase in the engine output. When it is determined that the efficiency of the engine ENG does not deteriorate by at least the fifth threshold, a similar operation to the operation performed in the first example operation after determining that the increased MG1 power generation amount does not exceed the Win limit value may be performed. When it is determined that the efficiency of the engine ENG deteriorates by at least the fifth threshold, a similar operation to the operation performed in the first example operation after determining that the increased MG1 power generation amount exceeds the Win limit value may be performed.

Note that in the above description, the engine ENG is in the inoperative condition during the coasting period. However, the engine ENG may remain in the operative condition even during the coasting period. Likewise in this case, as long as the hybrid vehicle 10 coasts without using the engine output of the engine ENG, the hybrid vehicle 10 performs the coasting travel.

Here, referring to FIG. 11, the manner in which an excessive reduction in the SOC is suppressed in a case where the engine ENG remains in the operative condition during the coasting period will be described. FIG. 11 is a timing chart showing the user requested power, the vehicle speed, the engine output, the motor output serving as the output of the motor/generator MG2, the MG1 power generation amount serving as the amount of power generated by the motor/generator MG1, the MG2 power generation amount serving as the amount of power generated by (i.e. the amount of power regenerated by) the motor/generator MG2, and the SOC of the battery 500 in a case where an excessive reduction in the SOC is suppressed by increasing the MG1 power generation amount in accordance with the first example operation in a situation where the engine ENG remains in the operative condition during the coasting period.

The timing chart shown in FIG. 11 differs from the timing chart shown in FIG. 4 in that the engine output does not fall completely to zero during the coasting period. Note that FIG. 11 shows an example in which the engine output of the coasting period corresponds to an engine output in a case where the engine ENG performs a so-called idling operation. All other features of the timing chart shown in FIG. 11 may be identical to the other features of the timing chart shown in FIG. 4. The drawings shown in FIGS. 5 to 6 and FIGS. 8 to 10 are likewise identical. Hence, even when the engine ENG remains in the operative condition during the coasting period, deterioration of the fuel efficiency of the hybrid vehicle 10 due to an excessive reduction in the SOC is suppressed equally favorably.

In the above description, the second control unit 102 controls the motor/generator MG2 to regenerate power during the coasting period (see step S107 in FIG. 2). However, when the engine ENG remains in the operative condition during the coasting period, the second control unit 102 may control the motor/generator MG1 to generate power using at least a part of the engine output during the coasting period as well as, or instead of, controlling the motor/generator MG2 to regenerate power during the coasting period.

In the above description, the second control unit 102 controls the motor/generator MG2 to regenerate power over the entire inertia period. However, the second control unit 102 may control the motor/generator MG2 such that power is regenerated during a part of the coasting period and not regenerated during the remaining part of the coasting period.

In the above description, the second control unit 102 controls the motor/generator MG2 to regenerate power during the coasting period when the SOC satisfies the predetermined decrease condition. However, the second control unit 102 may control the motor/generator MG2 to regenerate power during the coasting period when a desired parameter other than the SOC satisfies a predetermined condition. For example, the second control unit 102 may control the motor/generator MG2 to regenerate power during the coasting period when the vehicle speed during the coasting period varies in a predetermined variation pattern. More specifically, for example, the second control unit 102 may control the motor/generator MG2 to regenerate power during the coasting period when the vehicle speed gradually increases during the coasting period. When the vehicle speed gradually increases during the coasting period, surplus kinetic energy is assumed to be generated by the hybrid vehicle 10. Hence, when power regeneration is performed during the coasting period while the vehicle speed gradually increases, the motor/generator MG2 regenerates power using the surplus kinetic energy. As a result, deterioration of the fuel efficiency due to a reduction in the length of the coasting period resulting from power regeneration during the coasting period is suppressed even more favorably.

An increase in the vehicle speed during the coasting period occurs when the hybrid vehicle 10 travels on a road having a downhill gradient (in other words, travels downhill). Note, however, that while the hybrid vehicle 10 travels on a road having a downhill gradient, the first control unit 101 does not have to control the hybrid vehicle 10 to perform the acceleration coasting travel. For example, the first control unit 101 may control the hybrid vehicle 10 to perform continuous coasting travel. Further, the second control unit 102 may control the motor/generator MG2 to regenerate power in at least a part of the coasting period. In this case, the engine ENG may be set in the inoperative condition.

An example in which the hybrid vehicle 10 employs a so-called split (power split) hybrid system (for example, a THS: Toyota Hybrid System) was described above. However, the ECU 100 may control the hybrid vehicle 10 in the manner described above likewise when the hybrid vehicle 10 employs a parallel hybrid system or a series hybrid system.

In the above description, the hybrid vehicle 10 includes the plurality of motor/generators MG1 and MG2. However, the hybrid vehicle 10 may include a single motor/generator. Alternatively, the hybrid vehicle 10 may include, instead of or in addition to the one or more motor/generators, another desired power generator (for example an alternator, a generator, or the like) that is capable of generating power using at least one of the engine output of the engine ENG and the kinetic energy of the hybrid vehicle 10. Likewise in these cases, the ECU 100 may control the hybrid vehicle 10 in the manner described above.

Note that the embodiments of the invention may be modified appropriately within a scope that does not depart from the substance or concept of the invention as interpreted from the claims and the entire specification, and a vehicle control apparatus obtained as a result of these modifications is also included in the technical scope of the invention.

The invention can be summarized as follows.

A first aspect of the invention relates to a vehicle control apparatus that controls a vehicle including an internal combustion engine, a power generation unit that converts at least one of an engine output of the internal combustion engine and a kinetic energy of the vehicle into electric power, and a power storage unit that stores the electric power converted by the power generation unit. The vehicle control apparatus includes: a first control unit configured to control the vehicle to alternate repeatedly between acceleration travel, in which the vehicle accelerates using the engine output, and coasting travel, in which the vehicle coasts without using the engine output, such that a vehicle speed of the vehicle is maintained within a predetermined speed region; and a second control unit configured to control the power generation unit to convert at least one of the engine output and the kinetic energy into electric power during a coasting period in which the vehicle performs the coasting travel.

With the vehicle control apparatus, the vehicle including the internal combustion engine, the power generation unit, and the power storage unit can be controlled. The power generation unit converts the engine output of the internal combustion engine into electric power. The power generation unit converts the kinetic energy of the vehicle into electric power either in addition to or instead of the engine output of the internal combustion engine. A motor/generator, an alternator, or the like, for example, may be used as the power generation unit. The electric power converted (i.e. generated) by the power generation unit is stored in the power storage unit.

To control the vehicle in this manner, the vehicle control apparatus includes the first control unit and the second control unit.

The first control unit controls the vehicle to alternate repeatedly between the acceleration travel and the coasting travel such that the vehicle speed is maintained within the predetermined speed region. As a result, the vehicle can travel continuously at a substantially constant vehicle speed.

During the acceleration travel, the vehicle travels by power running (typically acceleration) using the engine output. During the acceleration travel, the vehicle uses the engine output, and therefore the internal combustion engine is set in an operative condition. During the coasting travel, on the other hand, the vehicle coasts without using the engine output. During the coasting travel, the vehicle does not use the engine output, and therefore the internal combustion engine may be set in an inoperative condition in order to improve a fuel efficiency of the vehicle. Note, however, that the internal combustion engine of the vehicle may be set in the operative condition likewise during the coasting travel. In other words, the coasting travel may be said to be underway in the vehicle even when the internal combustion engine is in the operative condition as long as the vehicle does not perform power running using the engine output of the internal combustion engine in the operative condition.

The second control unit controls the power generation unit to convert at least one of the engine output of the internal combustion engine and the kinetic energy of the vehicle into electric power. More particularly, the second control unit controls the power generation unit to convert at least one of the engine output and the kinetic energy into electric power during the coasting period in which the vehicle performs the coasting travel. In other words, the second control unit controls the power generation unit such that power is generated during the coasting period. At this time, the second control unit may control the power generation unit to convert at least one of the engine output and the kinetic energy into electric power over the entire inertia period. Alternatively, the second control unit may control the power generation unit to convert at least one of the engine output and the kinetic energy into electric power over a part of the coasting period.

When the vehicle is performing the coasting travel and the internal combustion engine is in the inoperative condition, for example, the second control unit may control the power generation unit to convert the kinetic energy (more specifically, at least a part of the kinetic energy) into electric power during the coasting period. When the vehicle is performing the coasting travel and the internal combustion engine is in the operative condition, for example, the second control unit may control the power generation unit to convert at least one of the engine output (more specifically, at least a part of the engine output) and the kinetic energy (more specifically, at least a part of the kinetic energy) into electric power during the coasting period.

Hence, the power generation unit is capable of generating power mainly under the control of the second control unit not only during the acceleration period, in which the vehicle performs the acceleration travel, but also during the coasting period. In other words, the power storage unit is charged during both the acceleration period and the coasting period. Therefore, a reduction in the power storage amount of the power storage unit (in other words, the amount of power stored in the power storage unit) while the vehicle alternates repeatedly between the acceleration travel and the coasting travel is suppressed (in other words prevented) favorably. Accordingly, an excessive reduction in the power storage amount of the power storage unit is likewise suppressed favorably. As a result, deterioration of the fuel efficiency of the vehicle due to an excessive reduction in the power storage amount of the power storage unit is suppressed favorably.

The second control unit may be configured to control the power generation unit to convert at least one of the engine output and the kinetic energy into electric power during the coasting period when a power storage amount of the power storage unit decreases while the vehicle alternates repeatedly between the acceleration travel and the coasting travel.

According to this configuration, a reduction in the power storage amount of the power storage unit as the vehicle alternates repeatedly between the acceleration travel and the coasting travel is suppressed favorably. Accordingly, an excessive reduction in the power storage amount of the power storage unit is likewise suppressed favorably. As a result, deterioration of the fuel efficiency of the vehicle due to an excessive reduction in the power storage amount of the power storage unit is suppressed favorably.

Note that when the power generation unit converts at least one of the engine output and the kinetic energy into electric power during the coasting period, a speed at which the vehicle speed decreases during the coasting period is greater than when the power generation unit does not convert at least one of the engine output and the kinetic energy into electric power during the coasting period. Therefore, when at least one of the engine output and the kinetic energy is converted into electric power during the coasting period, the coasting period decreases in length. In other words, when the power generation unit converts at least one of the engine output and the kinetic energy into electric power during the coasting period, the coasting period is shorter than when the power generation unit does not convert at least one of the engine output and the kinetic energy into electric power during the coasting period. On the other hand, the fuel efficiency of the vehicle improves steadily as the coasting period, in which the internal combustion engine is preferably set in the inoperative condition (or in which the engine output is not used for vehicle travel even when the internal combustion engine is in the operative condition, and therefore the engine output decreases relatively), increases in length. Hence, to improve the fuel efficiency, the power generation unit may be prevented from converting at least one of the engine output and the kinetic energy into electric power during the coasting period. According to this configuration, therefore, in order that an excessive reduction in the length of the coasting period is avoided, the second control unit controls the power generation unit to convert at least one of the engine output and the kinetic energy into electric power during the coasting period selectively when a reduction in the power storage amount that may cause the fuel efficiency to deteriorate occurs. In other words, when a reduction in the power storage amount that may cause the fuel efficiency to deteriorate does not occur, the second control unit need not control the power generation unit to convert at least one of the engine output and the kinetic energy into electric power during the coasting period. As a result, an excessive reduction in the length of the coasting period that may occur when at least one of the engine output and the kinetic energy is converted into electric power during the coasting period is suppressed while also favorably suppressing deterioration of the fuel efficiency of the vehicle due to an excessive reduction in the power storage amount of the power storage unit.

Here, a "reduction in the power storage amount" indicates a phenomenon whereby the vehicle continues to travel after the "reduction in the power storage amount" occurs such that the power storage amount may fall (typically, decrease excessively or fall below a predetermined threshold). A "reduction in the power storage amount" may occur in this manner when, for example, the amount by which the power storage amount increases during the acceleration period, in which the acceleration travel is performed, is smaller than the amount by which the power storage amount decreases during the coasting period. Accordingly, a "reduction in the power storage amount" may indicate a reduction in the power storage amount between the start of the acceleration period in which the acceleration travel is performed and the end of the coasting period following the acceleration period, for example. In this case, it may be said that the power storage amount has decreased when the power storage amount at the start of the acceleration period, in which the acceleration travel is performed, is larger than the power storage amount at the end of the coasting period following the acceleration period. On the other hand, it may be said that the power storage amount has not decreased when the power storage amount at the start of the acceleration period, in which the acceleration travel is performed, is not larger than the power storage amount at the end of the coasting period following the acceleration period. In other words, a "reduction in the power storage amount" need not indicate a temporary or momentary reduction in a momentary value of the power storage amount. To put it another way, the "reduction in the power storage amount" is a phenomenon that may occur when the momentary value of the power storage amount temporarily or momentarily increases. Hence, the "reduction in the power storage amount" means an incremental reduction in an average value of the power storage amount.

Alternatively, the vehicle control apparatus that controls the power generation unit to convert at least one of the engine output and the kinetic energy into electric power during the coasting period when the power storage amount decreases as the vehicle alternates repeatedly between the acceleration travel and the coasting travel, as described above, is configured to further include a third control unit that controls the power generation unit to convert the engine output into electric power during the acceleration period in which the vehicle performs the acceleration travel, and the second control unit controls the power generation unit to convert at least one of the engine output and the kinetic energy into electric power during the coasting period when the power storage amount decreases as the vehicle alternates repeatedly between the acceleration travel and the coasting travel even in a case where the power generation unit converts the engine output into electric power during the acceleration period.

According to this configuration, the power generation unit normally converts the engine output into electric power during the acceleration period, in which the internal combustion engine is in the operative condition, under the control of the third control unit. In this case, the power generation unit may convert the engine output into electric power over the entire acceleration period. Alternatively, the power generation unit may convert the engine output into electric power over at least a part of the acceleration period.

Depending on the amount of power generated by the power generation unit during the acceleration period and a consumption amount of the power stored in the power storage unit, however, the power storage amount may decrease as the vehicle alternates repeatedly between the acceleration travel and the coasting travel even in a case where the power generation unit converts the engine output into electric power during the acceleration period. For example, the power storage amount may decrease as the vehicle alternates repeatedly between the acceleration travel and the coasting travel even in a case where the power generation unit converts the engine output into electric power during the acceleration period when the amount of power generated by the power generation unit during the acceleration period is relatively small or the consumption amount of the power stored in the power storage unit is relatively large.

Hence, when the power storage amount decreases as the vehicle alternates repeatedly between the acceleration travel and the coasting travel even in a case where the power generation unit converts the engine output into electric power during the acceleration period, the second control unit controls the power generation unit to convert at least one of the engine output and the kinetic energy into electric power during the coasting period either instead of or in addition to converting the engine output into electric power during the acceleration period. Therefore, a reduction in the power storage amount of the power storage unit as the vehicle alternates repeatedly between the acceleration travel and the coasting travel is suppressed favorably. Hence, an excessive reduction in the power storage amount of the power storage unit is likewise suppressed favorably. As a result, deterioration of the fuel efficiency of the vehicle due to an excessive reduction in the power storage amount of the power storage unit is suppressed favorably.

The second control unit may be configured to control the power generation unit to convert at least one of the engine output and the kinetic energy into electric power during the coasting period when (i) the power storage amount decreases and (ii) it is not possible to increase an amount of power obtained by the power generation unit by converting the engine output into electric power during an acceleration period in which the vehicle performs the acceleration travel so as to stop the power storage amount decreasing. In this case, the vehicle control apparatus may further include the third control unit described above in order to control the power generation unit to convert the engine output into electric power during the acceleration period.

The amount of power generated by the power generation unit can typically be modified as desired. For example, the amount of power generated by the power generation unit can be increased by increasing the engine output. Therefore, when the power storage amount decreases as the vehicle alternates repeatedly between the acceleration travel and the coasting travel even in a case where the power generation unit converts the engine output into electric power during the acceleration period, the reduction in the power storage amount may be suppressed by increasing the amount of power generated by the power generation unit during the acceleration period. However, it may be impossible for some reason to increase the amount of power generated by the power generation unit during the acceleration period so as to stop the power storage amount decreasing (i.e. to suppress the reduction in the power storage amount).

According to this configuration, therefore, the second control unit controls the power generation unit to convert at least one of the engine output and the kinetic energy into electric power during the coasting period selectively when it is not possible to increase the amount of power generated during the acceleration period so as to suppress a reduction in the power storage amount as the vehicle alternates repeatedly between the acceleration travel and the coasting travel. In other words, when it is possible to increase the amount of power generated during the acceleration period so as to suppress a reduction in the power storage amount as the vehicle alternates repeatedly between the acceleration travel and the coasting travel, the second control unit need not control the power generation unit to convert at least one of the engine output and the kinetic energy into electric power during the coasting period. As a result, an excessive reduction in the length of the coasting period is suppressed while also favorably suppressing deterioration of the fuel efficiency of the vehicle due to an excessive reduction in the power storage amount of the power storage unit.

Alternatively, the vehicle control apparatus that controls the power generation unit to convert at least one of the engine output and the kinetic energy into electric power during the coasting period when it is not possible to increase the amount of power obtained by having the power generation unit convert the engine output into electric power during the acceleration period so as to stop the power storage amount decreasing, as described above, is configured such that the second control unit controls the power generation unit not to convert the engine output and the kinetic energy into electric power during the coasting period when it is possible to increase the amount of power obtained by having the power generation unit convert the engine output into electric power during the acceleration period so as to stop the power storage amount decreasing.

According to this configuration, the second control unit controls the power generation unit not to convert the engine output and the kinetic energy into electric power during the coasting period when it is possible to increase the amount of power generated during the acceleration period so as to suppress a reduction in the power storage amount as the vehicle alternates repeatedly between the acceleration travel and the coasting travel. In this case, the power generation unit preferably increases the amount of power generated during the acceleration period so as to suppress a reduction in the power storage amount as the vehicle alternates repeatedly between the acceleration travel and the coasting travel. For example, when the vehicle control apparatus includes the third control unit described above, the third control unit preferably controls the power generation unit to increase amount of power generated during the acceleration period so as to suppress a reduction in the power storage amount as the vehicle alternates repeatedly between the acceleration travel and the coasting travel. As a result, an excessive reduction in the length of the coasting period is suppressed while also favorably suppressing deterioration of the fuel efficiency of the vehicle due to an excessive reduction in the power storage amount of the power storage unit.

Alternatively, the vehicle control apparatus that controls the power generation unit to convert at least one of the engine output and the kinetic energy into electric power during the coasting period when the power storage amount decreases as the vehicle alternates repeatedly between the acceleration travel and the coasting travel, as described above, is configured such that the second control unit controls the power generation unit to convert at least one of the engine output and the kinetic energy into electric power during the coasting period when (i) the power storage amount decreases, and (ii) the amount of power obtained by having the power generation unit convert the engine output into electric power during the acceleration period so as to stop the power storage amount decreasing exceeds an upper limit value of the amount of power that can be input into the power storage unit. In this case, the vehicle control apparatus may further include the third control unit described above in order to control the power generation unit to convert the engine output into electric power during the acceleration period.

When the power storage amount decreases as the vehicle alternates repeatedly between the acceleration travel and the coasting travel even in a case where the power generation unit converts the engine output into electric power during the acceleration period, the reduction in the power storage amount may be suppressed by increasing the amount of power generated by the power generation unit during the acceleration period, as described above. When the amount of power generated during the acceleration period (more particularly, a minimum required power generation amount at which the reduction in the power storage amount can be suppressed) exceeds the upper limit value (a so-called Win limit value) of the amount of power that can be input into the power storage unit, however, the power generation unit cannot increase the amount of power generated during the acceleration period so as to stop the power storage amount decreasing (i.e. to suppress the reduction in the power storage amount).

According to this configuration, therefore, the second control unit controls the power generation unit to convert at least one of the engine output and the kinetic energy into electric power during the coasting period selectively when it is not possible to increase the amount of power generated during the acceleration period so as to suppress a reduction in the power storage amount as the vehicle alternates repeatedly between the acceleration travel and the coasting travel. As a result, an excessive reduction in the length of the coasting period is suppressed while also favorably suppressing deterioration of the fuel efficiency of the vehicle due to an excessive reduction in the power storage amount of the power storage unit.

Alternatively, the vehicle control apparatus that controls the power generation unit to convert at least one of the engine output and the kinetic energy into electric power during the coasting period when the amount of power obtained by having the power generation unit convert the engine output into electric power during the acceleration period exceeds the upper limit value of the amount of power that can be input into the power storage unit, as described above, is configured such that the second control unit controls the power generation unit not to convert the engine output and the kinetic energy into electric power during the coasting period when the amount of power obtained by having the power generation unit convert the engine output into electric power during the acceleration period to stop the power storage unit decreasing does not exceed the upper limit value.

According to this configuration, the second control unit controls the power generation unit not to convert the engine output and the kinetic energy into electric power during the coasting period when it is possible to increase the amount of power generated during the acceleration period so as to suppress a reduction in the power storage amount as the vehicle alternates repeatedly between the acceleration travel and the coasting travel. In this case, the power generation unit preferably increases the amount of power generated during the acceleration period so as to suppress a reduction in the power storage amount as the vehicle alternates repeatedly between the acceleration travel and the coasting travel. For example, when the vehicle control apparatus includes the third control unit described above, the third control unit preferably controls the power generation unit to increase amount of power generated during the acceleration period so as to suppress a reduction in the power storage amount as the vehicle alternates repeatedly between the acceleration travel and the coasting travel. As a result, an excessive reduction in the length of the coasting period is suppressed while also favorably suppressing deterioration of the fuel efficiency of the vehicle due to an excessive reduction in the power storage amount of the power storage unit.

The second control unit may be configured to control the power generation unit to convert at least one of the engine output and the kinetic energy into electric power during the coasting period when (i) the power storage amount decreases and (ii) an efficiency of a powertrain of the vehicle, the powertrain including the internal combustion engine, deteriorates by at least a predetermined amount after an amount of power obtained by the power generation unit by converting the engine output into electric power during an acceleration period in which the vehicle performs the acceleration travel is increased so as to stop the power storage amount decreasing. In this case, the vehicle control apparatus may further include the third control unit described above in order to control the power generation unit to convert the engine output into electric power during the acceleration period.

When the power storage amount decreases as the vehicle alternates repeatedly between the acceleration travel and the coasting travel even in a case where the power generation unit converts the engine output into electric power during the acceleration period, the reduction in the power storage amount may be suppressed by increasing the amount of power generated by the power generation unit during the acceleration period, as described above. The power generation amount is typically increased by increasing the engine output. However, an increase in the engine output leads to variation in the operating point of the internal combustion engine, and when the operating point of the internal combustion engine is modified, the efficiency of the powertrain of the vehicle, the powertrain including the internal combustion engine, varies (deteriorates, for example). When the efficiency of the powertrain varies (deteriorates, for example), the fuel efficiency of the vehicle varies (deteriorates, for example). Therefore, when the amount of power generated during the acceleration period is increased in order to suppress deterioration of the fuel efficiency due to an excessive reduction in the power storage amount, the efficiency of the powertrain may deteriorate, causing the fuel efficiency to deteriorate even further.

According to this configuration, therefore, the second control unit controls the power generation unit to convert at least one of the engine output and the kinetic energy into electric power during the coasting period selectively when the efficiency of the powertrain deteriorates by at least the predetermined amount after the amount of power generated during the acceleration period is increased so as to suppress a reduction in the power storage amount as the vehicle alternates repeatedly between the acceleration travel and the coasting travel. In this case, the power generation unit preferably prevents the efficiency of the powertrain from deteriorating during the acceleration period by not increasing the amount of power generated during the acceleration period. For example, when the vehicle control apparatus includes the third control unit described above, the third control unit preferably prevents the efficiency of the powertrain from deteriorating during the acceleration period by not controlling the power generation unit to increase the amount of power generated during the acceleration period. As a result, an excessive reduction in the length of the coasting period is suppressed while also favorably suppressing deterioration of the fuel efficiency of the vehicle due to an excessive reduction in the power storage amount of the power storage unit and deterioration of the fuel efficiency of the vehicle due to deterioration of the efficiency of the powertrain.

Alternatively, the vehicle control apparatus that controls the power generation unit to convert at least one of the engine output and the kinetic energy into electric power during the coasting period when the efficiency of the powertrain deteriorates by at least the predetermined amount, as described above, is configured such that the second control unit controls the power generation unit not to convert the engine output and the kinetic energy into electric power during the coasting period when the efficiency does not deteriorate by at least the predetermined amount.

According to this configuration, when the efficiency of the powertrain does not deteriorate by at least the predetermined amount even after the amount of power generated during the acceleration period is increased so as to suppress a reduction in the power storage amount as the vehicle alternates repeatedly between the acceleration travel and the coasting travel, the second control unit controls the power generation unit not to convert the engine output and the kinetic energy into electric power during the coasting period. In this case, the power generation unit preferably increases the amount of power generated during the acceleration period so as to suppress a reduction in the power storage amount as the vehicle alternates repeatedly between the acceleration travel and the coasting travel. For example, when the vehicle control apparatus includes the third control unit described above, the third control unit preferably controls the power generation unit to increase the amount of power generated during the acceleration period so as to suppress a reduction in the power storage amount as the vehicle alternates repeatedly between the acceleration travel and the coasting travel. As a result, an excessive reduction in the length of the coasting period is suppressed while also favorably suppressing deterioration of the fuel efficiency of the vehicle due to an excessive reduction in the power storage amount of the power storage unit and deterioration of the fuel efficiency of the vehicle due to deterioration of the efficiency of the powertrain.

During the acceleration travel, the internal combustion engine may be set in an operative condition, and during the coasting travel, the internal combustion engine may be set in an inoperative condition. In this case, the second control unit may be configured to control the power generation unit to convert the kinetic energy into electric power during at least a part of the coasting period.

According to this configuration, a reduction in the power storage amount of the power storage unit is suppressed favorably as the vehicle alternates repeatedly between the acceleration travel, in which the internal combustion engine is in the operative condition, and the coasting travel, in which the internal combustion engine is in the inoperative condition. Accordingly, an excessive reduction in the power storage amount of the power storage unit is likewise suppressed favorably. As a result, deterioration of the fuel efficiency of the vehicle due to an excessive reduction in the power storage amount of the power storage unit is suppressed favorably.

What is claimed is:

1. A vehicle control apparatus that controls a vehicle including an internal combustion engine, a power generation unit that converts at least one of an engine output of the internal combustion engine and a kinetic energy of the vehicle into electric power, and a power storage unit that stores the electric power converted by the power generation unit, the vehicle control apparatus comprising:
   a first control unit configured to control the vehicle to alternate repeatedly between acceleration travel, in which the vehicle accelerates using the engine output, and coasting travel, in which the vehicle coasts without using the engine output, such that a vehicle speed of the vehicle is maintained within a predetermined speed region; and
   a second control unit configured to control the power generation unit to convert at least one of the engine output and the kinetic energy into electric power during a coasting period in which the vehicle performs the coasting travel, wherein
   the second control unit is further configured to control the power generation unit to convert at least one of the engine output and the kinetic energy into electric power during the coasting period when (i) the power storage amount decreases and (ii) it is not possible to increase an amount of power obtained by the power generation unit by converting the engine output into electric power during an acceleration period in which the vehicle performs the acceleration travel so as to stop the power storage amount decreasing.

2. The vehicle control apparatus according to claim 1, wherein:
   during the acceleration travel, the internal combustion engine is set in an operative condition;
   during the coasting travel, the internal combustion engine is set in an inoperative condition; and
   the second control unit is configured to control the power generation unit to convert the kinetic energy into electric power during at least a part of the coasting period.

3. A vehicle control apparatus that controls a vehicle including an internal combustion engine, a power generation unit that converts at least one of an engine output of the internal combustion engine and a kinetic energy of the vehicle into electric power, and a power storage unit that stores the electric power converted by the power generation unit, the vehicle control apparatus comprising:
   a first control unit configured to control the vehicle to alternate repeatedly between acceleration travel, in which the vehicle accelerates using the engine output, and coasting travel, in which the vehicle coasts without using the engine output, such that a vehicle speed of the vehicle is maintained within a predetermined speed region; and
   a second control unit configured to control the power generation unit to convert at least one of the engine output and the kinetic energy into electric power during a coasting period in which the vehicle performs the coasting travel, wherein
   the second control unit is further configured to control the power generation unit to convert at least one of the engine output and the kinetic energy into electric power during the coasting period when (i) the power storage amount decreases and (ii) an efficiency of a powertrain of the vehicle, the powertrain including the internal combustion engine, deteriorates by at least a predetermined amount after an amount of power obtained by the power generation unit by converting the engine output into electric power during an acceleration period in which the vehicle performs the acceleration travel is increased so as to stop the power storage amount decreasing.

4. A vehicle control method for controlling a vehicle including an internal combustion engine, power generation unit that converts at least one of an engine output of the internal combustion engine and a kinetic energy of the vehicle into electric power, and power storage unit that stores the electric power converted by the power generation unit, the vehicle control method comprising:
   controlling the vehicle to alternate repeatedly between acceleration travel, in which the vehicle accelerates using the engine output, and coasting travel, in which the vehicle coasts without using the engine output, such that a vehicle speed of the vehicle is maintained within a predetermined speed region; and
   controlling the power generation unit to convert at least one of the engine output and the kinetic energy into electric power during a coasting period in which the vehicle performs the coasting travel when (i) the power storage amount decreases and (ii) it is not possible to increase an amount of power obtained by the power generation unit by converting the engine output into electric power during an acceleration period in which the vehicle performs the acceleration travel so as to stop the power storage amount decreasing.

* * * * *